United States Patent
Allison et al.

(10) Patent No.: US 11,621,983 B1
(45) Date of Patent: *Apr. 4, 2023

(54) ELECTRONIC CONTENT SHARING

(71) Applicant: Zillow, Inc., Seattle, WA (US)

(72) Inventors: Gregory Austin Allison, Cincinnati, OH (US); Justin Y. Hu, Talmage, CA (US); Matthew Allan Vorst, Blue Ash, OH (US)

(73) Assignee: MFTB Holdco, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,004

(22) Filed: Jan. 13, 2022

Related U.S. Application Data

(63) Continuation of application No. 17/022,644, filed on Sep. 16, 2020, now Pat. No. 11,258,837, which is a continuation of application No. 14/177,656, filed on Feb. 11, 2014, now Pat. No. 10,826,951.

(60) Provisional application No. 61/875,352, filed on Sep. 9, 2013, provisional application No. 61/763,278, filed on Feb. 11, 2013.

(51) Int. Cl.
  *G06Q 10/10* (2012.01)
  *H04L 65/403* (2022.01)
  *G06Q 10/101* (2023.01)

(52) U.S. Cl.
  CPC ......... *H04L 65/403* (2013.01); *G06Q 10/101* (2013.01)

(58) Field of Classification Search
  CPC .............................. G06Q 10/10; G06Q 10/06
  See application file for complete search history.

(56) References Cited

U.S. PATENT DOCUMENTS

| | | | |
|---|---|---|---|
| 4,747,093 A | 5/1988 | Benne et al. |
| 4,870,576 A | 9/1989 | Tornetta |
| 4,912,653 A | 3/1990 | Wood |
| 5,032,989 A | 7/1991 | Tornetta |
| D321,903 S | 11/1991 | Chepaitis |
| 5,317,646 A | 5/1994 | Sant et al. |
| 5,325,297 A | 6/1994 | Bird et al. |
| 5,361,201 A | 11/1994 | Jost |
| 5,392,388 A | 2/1995 | Gibson |

(Continued)

FOREIGN PATENT DOCUMENTS

| | | |
|---|---|---|
| KR | 1020020092595 | 12/2002 |
| KR | 1020070059931 | 6/2007 |

(Continued)

OTHER PUBLICATIONS

Adobe Acrobat DC, "Convert existing forms to fillable PDFs," 2015, 12 pages.

(Continued)

*Primary Examiner* — Glenford J Madamba
(74) *Attorney, Agent, or Firm* — Perkins Coie LLP

(57) ABSTRACT

Systems and methods are disclosed for sharing electronic content between a plurality of users. The electronic content can be accessed by the users through interactions with a virtual collaborative workspace. The members of a virtual collaborative workspace can be dependent upon the shared electronic content. Certain actions can be asked of various users with regard to the electronic content. Once the action has been performed, the electronic content can be routed to various other users in an automated fashion.

20 Claims, 14 Drawing Sheets

(56) References Cited

U.S. PATENT DOCUMENTS

| | | |
|---|---|---|
| 5,465,308 A | 11/1995 | Hutcheson |
| 5,526,341 A | 6/1996 | Shiba et al. |
| 5,606,609 A | 2/1997 | Houser et al. |
| 5,623,655 A | 4/1997 | Chisaka |
| 5,636,117 A | 6/1997 | Rothstein |
| 5,680,305 A | 10/1997 | Apgar |
| 5,754,850 A | 5/1998 | Janssen |
| D396,455 S | 7/1998 | Bier |
| 5,848,187 A | 12/1998 | Bricklin et al. |
| 5,943,679 A | 8/1999 | Niles |
| 5,946,667 A | 8/1999 | Tull |
| 6,032,123 A | 2/2000 | Jameson |
| 6,067,831 A | 5/2000 | Hoyt et al. |
| 6,289,460 B1 | 11/2001 | Hajmiragha |
| 6,401,070 B1 | 6/2002 | McManus |
| 6,519,618 B1 | 2/2003 | Snyder |
| D474,197 S | 5/2003 | Nguyen |
| D477,242 S | 7/2003 | Laats |
| 6,594,633 B1 | 7/2003 | Broeman |
| 6,609,109 B1 | 8/2003 | Bradley |
| 6,609,118 B1 | 8/2003 | Khedkar |
| 6,636,803 B1 | 10/2003 | Hartz |
| 6,651,217 B1 | 11/2003 | Kennedy et al. |
| 6,684,196 B1 | 1/2004 | Mini et al. |
| 6,711,554 B1 | 3/2004 | Salzamann et al. |
| 6,810,404 B1 | 10/2004 | Ferguson et al. |
| 6,898,317 B2 | 5/2005 | Struble et al. |
| 6,920,455 B1 | 7/2005 | Wescheler |
| 6,944,648 B2 | 9/2005 | Dochran et al. |
| D521,019 S | 5/2006 | Ording |
| 7,143,290 B1 | 11/2006 | Ginter et al. |
| D536,343 S | 2/2007 | Fong et al. |
| D544,495 S | 6/2007 | Evans et al. |
| 7,228,319 B1 | 6/2007 | Fuchs |
| D554,660 S | 11/2007 | Hoover et al. |
| D554,661 S | 11/2007 | Hoover et al. |
| 7,296,001 B1 | 11/2007 | Ephrati |
| 7,299,408 B1 | 11/2007 | Daconta et al. |
| 7,334,187 B1 | 2/2008 | Stanciu |
| D566,722 S | 4/2008 | Jackson |
| 7,376,891 B2 | 5/2008 | Hitchcock et al. |
| D572,726 S | 7/2008 | Guimaraes et al. |
| 7,475,333 B2 | 1/2009 | Otter et al. |
| D591,305 S | 4/2009 | Shimoda |
| 7,543,228 B2 | 6/2009 | Kelkar et al. |
| D595,727 S | 7/2009 | Koes et al. |
| D599,284 S | 9/2009 | Misumi |
| D599,814 S | 9/2009 | Ogura et al. |
| D601,159 S | 9/2009 | Truelove et al. |
| 7,692,635 B2 | 4/2010 | Iwamura |
| 7,702,999 B1 | 4/2010 | Sperr et al. |
| D615,551 S | 5/2010 | Arnell |
| 7,725,359 B1 | 5/2010 | Katzfey et al. |
| D619,593 S | 7/2010 | Fujioka et al. |
| 7,765,125 B1 | 7/2010 | An |
| D624,557 S | 9/2010 | Allen et al. |
| 7,818,219 B2 | 10/2010 | Klivington et al. |
| 7,822,691 B1 | 10/2010 | Kuo |
| 7,917,842 B2 | 3/2011 | Garrison |
| 7,945,496 B2 | 5/2011 | Trott |
| 7,970,684 B1 | 6/2011 | Benda |
| 7,987,117 B2 | 7/2011 | Mozley |
| D643,047 S | 8/2011 | Guss et al. |
| D644,243 S | 8/2011 | Matas |
| D644,654 S | 9/2011 | Maitlen et al. |
| D650,790 S | 12/2011 | Jeans et al. |
| D650,807 S | 12/2011 | Impas et al. |
| D652,426 S | 1/2012 | Anzures |
| D654,925 S | 2/2012 | Nishizawa et al. |
| 8,145,909 B1 | 3/2012 | Agrawal |
| D656,954 S | 4/2012 | Arnold et al. |
| 8,151,209 B2 | 4/2012 | Law et al. |
| D659,711 S | 5/2012 | Guss et al. |
| D660,317 S | 5/2012 | Jesberger |
| D664,205 S | 7/2012 | Xu et al. |
| D665,161 S | 8/2012 | Leifeld et al. |
| D665,162 S | 8/2012 | Leifeld et al. |
| D665,163 S | 8/2012 | Leifeld et al. |
| D665,421 S | 8/2012 | Morrow et al. |
| 8,239,496 B2 | 8/2012 | Peterson et al. |
| D667,429 S | 9/2012 | Wujcik et al. |
| D669,497 S | 10/2012 | Lee et al. |
| D669,499 S | 10/2012 | Gardner et al. |
| D671,558 S | 11/2012 | Anzures et al. |
| D676,060 S | 2/2013 | Frost et al. |
| D676,457 S | 2/2013 | Frost et al. |
| 8,375,016 B2 | 2/2013 | Allison |
| D677,180 S | 3/2013 | Plitkins et al. |
| D682,305 S | 5/2013 | Mierau et al. |
| D682,882 S | 5/2013 | Cahill et al. |
| D683,757 S | 6/2013 | Phelan |
| D684,185 S | 6/2013 | Van Dongen et al. |
| D684,990 S | 6/2013 | Walsh |
| D687,046 S | 7/2013 | Plitkins et al. |
| D687,057 S | 7/2013 | Plitkins |
| D687,460 S | 8/2013 | Tyler et al. |
| D687,851 S | 8/2013 | Sloo et al. |
| D689,505 S | 9/2013 | Convay et al. |
| D690,717 S | 10/2013 | Thomsen et al. |
| D690,718 S | 10/2013 | Thomsen et al. |
| D691,629 S | 10/2013 | Matas et al. |
| D692,444 S | 10/2013 | Lee et al. |
| 8,583,562 B1 | 11/2013 | McDaniel |
| 8,589,191 B1 | 11/2013 | Menzies |
| D696,265 S | 12/2013 | d'Amore et al. |
| D697,076 S | 1/2014 | Oda et al. |
| D697,518 S | 1/2014 | Thomsen et al. |
| D697,519 S | 1/2014 | Thomsen et al. |
| D697,935 S | 1/2014 | Lee et al. |
| D698,363 S | 1/2014 | Asai |
| D699,248 S | 2/2014 | Pearson et al. |
| D699,250 S | 2/2014 | Fuji et al. |
| D699,741 S | 2/2014 | Wantland et al. |
| D699,750 S | 2/2014 | Pearson et al. |
| D700,207 S | 2/2014 | Pearson et al. |
| 8,650,067 B1 | 2/2014 | Moss |
| 8,683,315 B2 | 3/2014 | Stover |
| D703,683 S | 4/2014 | Skidgel |
| D704,204 S | 5/2014 | Rydenhag |
| D705,263 S | 5/2014 | Hartley |
| D705,808 S | 5/2014 | Anzures et al. |
| D706,814 S | 6/2014 | Phelan |
| D707,705 S | 6/2014 | Folken et al. |
| D708,203 S | 7/2014 | Johnson |
| D708,221 S | 7/2014 | Danton et al. |
| D708,226 S | 7/2014 | Takata et al. |
| D709,917 S | 7/2014 | Faulkner et al. |
| D711,421 S | 8/2014 | Bautista |
| D715,313 S | 10/2014 | Hontz, Jr. |
| D715,322 S | 10/2014 | Sakata |
| D716,325 S | 10/2014 | Brudnicki |
| D717,334 S | 11/2014 | Sakuma |
| D717,335 S | 11/2014 | Sakuma |
| D717,681 S | 11/2014 | Shail et al. |
| D717,822 S | 11/2014 | Brotman et al. |
| D717,823 S | 11/2014 | Brotman et al. |
| D718,325 S | 11/2014 | Schoger et al. |
| D721,090 S | 1/2015 | Hong et al. |
| D721,093 S | 1/2015 | Pereira |
| 9,330,375 B2 | 5/2016 | Allison |
| 9,575,622 B1 | 2/2017 | Allison et al. |
| 9,785,627 B2 | 10/2017 | Campanelli et al. |
| 9,858,548 B2 | 1/2018 | Allison |
| 10,062,110 B1 | 8/2018 | Tatang |
| 10,108,928 B2 | 10/2018 | Allison |
| 10,552,525 B1 | 2/2020 | Allison |
| 10,733,364 B1 | 8/2020 | Allison |
| 10,826,951 B2 | 11/2020 | Allison |
| 11,176,518 B2 | 1/2021 | Allison |
| 10,976,885 B2 | 4/2021 | Allison |
| 11,393,057 B2 | 7/2022 | Allison |
| 2001/0039506 A1 | 11/2001 | Robbins |
| 2002/0035520 A1 | 3/2002 | Weiss |
| 2002/0065739 A1 | 5/2002 | Florence |

(56) References Cited

U.S. PATENT DOCUMENTS

| | | |
|---|---|---|
| 2002/0069358 A1 | 6/2002 | Silvester |
| 2002/0082849 A1 | 6/2002 | Tenorio |
| 2002/0087389 A1 | 7/2002 | Sklarz |
| 2002/0095570 A1 | 7/2002 | Eldridge |
| 2002/0099733 A1 | 7/2002 | Teruuchi et al. |
| 2002/0129056 A1 | 9/2002 | Conant et al. |
| 2002/0129656 A1 | 9/2002 | Conant et al. |
| 2002/0135440 A1 | 9/2002 | Ryhanen |
| 2002/0184485 A1 | 12/2002 | Dray, Jr. et al. |
| 2003/0046639 A1 | 3/2003 | Fai et al. |
| 2003/0056100 A1 | 3/2003 | Beatson |
| 2003/0101063 A1 | 5/2003 | Sexton |
| 2003/0121008 A1* | 6/2003 | Tischer ............... G06F 40/166 715/255 |
| 2003/0191719 A1 | 10/2003 | Ginter et al. |
| 2003/0220807 A1 | 11/2003 | Hoffmna |
| 2003/0227482 A1 | 12/2003 | Bach et al. |
| 2003/0229552 A1 | 12/2003 | Lebaric |
| 2003/0236832 A1 | 12/2003 | McIntyre |
| 2004/0085355 A1 | 5/2004 | Harmes |
| 2004/0098284 A1 | 5/2004 | Petito et al. |
| 2004/0128215 A1 | 7/2004 | Florence |
| 2004/0133493 A1 | 7/2004 | Ford et al. |
| 2004/0181749 A1 | 9/2004 | Chellapilla |
| 2004/0205534 A1 | 10/2004 | Koelle |
| 2004/0205653 A1 | 10/2004 | Hadfield et al. |
| 2004/0220885 A1 | 11/2004 | Salzmann et al. |
| 2004/0225884 A1 | 11/2004 | Lorenzini et al. |
| 2004/0255114 A1 | 12/2004 | Lee et al. |
| 2005/0086596 A1 | 4/2005 | Koch et al. |
| 2005/0108025 A1 | 5/2005 | Cagan |
| 2005/0177389 A1 | 8/2005 | Rakowicz et al. |
| 2005/0192930 A1 | 9/2005 | Hightower et al. |
| 2005/0231746 A1 | 10/2005 | Parry |
| 2005/0251535 A1 | 11/2005 | Theissen et al. |
| 2005/0273417 A1 | 12/2005 | Budish |
| 2006/0007189 A1 | 1/2006 | Gaines |
| 2006/0015435 A1 | 1/2006 | Nathanson |
| 2006/0026032 A1 | 2/2006 | Higgins |
| 2006/0026136 A1 | 2/2006 | Drucker et al. |
| 2006/0069599 A1 | 3/2006 | Hatoun |
| 2006/0085311 A1 | 4/2006 | Hoerle et al. |
| 2006/0116952 A1 | 6/2006 | Orfano |
| 2006/0149567 A1 | 7/2006 | Muller et al. |
| 2006/0161780 A1 | 7/2006 | Berryman et al. |
| 2006/0190810 A1 | 8/2006 | Piersol |
| 2006/0200308 A1 | 9/2006 | Arutunian |
| 2006/0259440 A1 | 11/2006 | Daryl et al. |
| 2006/0277123 A1 | 12/2006 | Kennedy et al. |
| 2007/0005383 A1 | 1/2007 | Kasower |
| 2007/0009158 A1 | 1/2007 | Geva et al. |
| 2007/0022141 A1 | 1/2007 | Singleton |
| 2007/0038533 A1 | 2/2007 | Huff |
| 2007/0088958 A1 | 4/2007 | Qa Im-mapami |
| 2007/0118391 A1 | 5/2007 | Malaney |
| 2007/0136361 A1 | 6/2007 | Jae et al. |
| 2007/0136679 A1 | 6/2007 | Yang |
| 2007/0168382 A1 | 7/2007 | Tillberg |
| 2007/0179881 A1 | 8/2007 | Lord |
| 2007/0186157 A1 | 8/2007 | Walker |
| 2007/0198910 A1 | 8/2007 | Jensen et al. |
| 2007/0198952 A1 | 8/2007 | Pittenger et al. |
| 2007/0255625 A1 | 11/2007 | Katzen |
| 2007/0282788 A1 | 12/2007 | Lamb et al. |
| 2008/0091700 A1 | 4/2008 | Brotherson |
| 2008/0091954 A1 | 4/2008 | Morris et al. |
| 2008/0097777 A1 | 4/2008 | Rielo |
| 2008/0133319 A1 | 6/2008 | Adiga |
| 2008/0154740 A1 | 6/2008 | Lee et al. |
| 2008/0155391 A1 | 6/2008 | Sattler et al. |
| 2008/0167941 A1 | 7/2008 | Kagarlis |
| 2008/0209313 A1 | 8/2008 | Gonser |
| 2008/0260287 A1 | 10/2008 | Berryman et al. |
| 2008/0262833 A1 | 10/2008 | Kano et al. |
| 2008/0288312 A1 | 11/2008 | Miles |
| 2008/0301064 A1 | 12/2008 | Burns |
| 2008/0319890 A1 | 12/2008 | Urbanski |
| 2009/0003588 A1 | 1/2009 | Ross |
| 2009/0006241 A1 | 1/2009 | Zhao |
| 2009/0018975 A1 | 1/2009 | Geltner |
| 2009/0024912 A1 | 1/2009 | McCabe et al. |
| 2009/0025087 A1 | 1/2009 | Perison et al. |
| 2009/0043685 A1 | 2/2009 | Benjamin |
| 2009/0109455 A1 | 4/2009 | Smith et al. |
| 2009/0173552 A1 | 7/2009 | Elder et al. |
| 2009/0192862 A1 | 7/2009 | Hoggard |
| 2009/0226090 A1 | 9/2009 | Okita |
| 2009/0029786 A1 | 11/2009 | McCabe et al. |
| 2009/0313158 A1 | 12/2009 | Del Monte |
| 2009/0320035 A1* | 12/2009 | Ahlgren ............... H04L 51/52 718/104 |
| 2010/0011286 A1 | 1/2010 | Isoda |
| 2010/0023379 A1 | 1/2010 | Rappaport |
| 2010/0057538 A1 | 3/2010 | Hardman |
| 2010/0076903 A1 | 3/2010 | Klingenberg |
| 2010/0131331 A1 | 5/2010 | Ginsburg |
| 2010/0161460 A1 | 6/2010 | Vroom et al. |
| 2010/0161498 A1 | 6/2010 | Walker |
| 2010/0235727 A1 | 9/2010 | Ashton et al. |
| 2010/0287260 A1 | 11/2010 | Peterson et al. |
| 2011/0026828 A1 | 2/2011 | Balasubramanian et al. |
| 2011/0178905 A1 | 7/2011 | Kagarlis |
| 2011/0199631 A1 | 8/2011 | Healy |
| 2011/0258535 A1 | 10/2011 | Alder et al. |
| 2011/0270766 A1 | 11/2011 | Ramakrishnan et al. |
| 2011/0271173 A1 | 11/2011 | Ait-Mokhar et al. |
| 2011/0276395 A1 | 11/2011 | Gaton et al. |
| 2011/0276875 A1 | 11/2011 | McCabe et al. |
| 2011/0313945 A1 | 12/2011 | Callan |
| 2011/0314371 A1 | 12/2011 | Peterson et al. |
| 2012/0063684 A1 | 3/2012 | Denoue |
| 2012/0066061 A1 | 3/2012 | Clement |
| 2012/0096383 A1 | 4/2012 | Sakamoto et al. |
| 2012/0102002 A1 | 4/2012 | Sathyanarayana |
| 2012/0102412 A1 | 4/2012 | Sinclair et al. |
| 2012/0144285 A1 | 6/2012 | Bach et al. |
| 2012/0209875 A1 | 8/2012 | Hintze |
| 2012/0254045 A1 | 10/2012 | Orfano |
| 2012/0254156 A1 | 10/2012 | Rao |
| 2012/0297277 A1 | 11/2012 | King |
| 2012/0297301 A1 | 11/2012 | Mahoney |
| 2013/0024788 A1 | 1/2013 | Olsen et al. |
| 2013/0036347 A1 | 2/2013 | Eftekhari et al. |
| 2013/0086624 A1* | 4/2013 | Powell ............... G06Q 30/06 726/1 |
| 2013/0096819 A1 | 4/2013 | Tarnok |
| 2013/0185753 A1 | 7/2013 | Kliot |
| 2013/0211945 A1 | 8/2013 | Po-Ching |
| 2013/0238965 A1 | 9/2013 | Barrus |
| 2013/0297442 A1 | 11/2013 | Simons |
| 2013/0317939 A1 | 11/2013 | Urbanski |
| 2013/0325623 A1 | 12/2013 | Balduf |
| 2013/0325665 A1* | 12/2013 | Shaffer ............... G09B 7/02 705/26.1 |
| 2013/0346151 A1 | 12/2013 | Bleakley |
| 2014/0033088 A1 | 1/2014 | Shaver |
| 2014/0164255 A1* | 6/2014 | Daly ............... G06Q 10/0631 705/80 |
| 2014/0164260 A1 | 6/2014 | Spieckerman |
| 2014/0236751 A1 | 8/2014 | Bloomfield |
| 2014/0380229 A1 | 12/2014 | Volodin et al. |
| 2015/0081497 A1 | 3/2015 | Patel |
| 2015/0242747 A1 | 8/2015 | Packes |
| 2015/0317701 A1 | 11/2015 | Thomas |
| 2015/0332371 A1 | 11/2015 | Lomas |
| 2018/0225593 A1 | 8/2018 | Cozine |
| 2021/0406830 A1 | 12/2021 | Allison |

FOREIGN PATENT DOCUMENTS

| | | |
|---|---|---|
| WO | WO1996007156 | 3/1996 |
| WO | WO0106416 | 1/2001 |
| WO | WO2009012475 | 1/2009 |

(56) References Cited

FOREIGN PATENT DOCUMENTS

| WO | WO2010105262 | 9/2010 |
|---|---|---|
| WO | WO2010151630 | 12/2010 |
| WO | WO2011139563 | 11/2011 |
| WO | WO2011056819 | 12/2011 |

OTHER PUBLICATIONS

Adobe Acrobat XI, "Convert an existing form into a fillable PDF form with Adobe Acrobat XI," Quick Start Guide, 2012, 1 page.
"E-Signature Custom Signature Fonts," http:/www.e-signature.com/en/prod01_en.htm, Mar. 28, 2006, 4pages.
FH FA, "House Price Index Frequently Asked Questions," Federal Housing Finance Agency, Aug. 2018, available at https://www .fhfa.gov/Media/PublicAffairs/Pages/House-Price-Index-Frequently-Asked-Questions.aspx (accessed Oct. 29, 2018), 9 pages.
Herboso,F., "Simple Docusign Instructions From Herboso & Associates." <https://activerain.com/blogsview/2083565/simple-docusign-instructions-from-herboso--associates/>2011, pp. 1-7.
International Search Report for International Patent Application No. PCT/US2009/061012, dated Feb. 22, 2010, 4 pages.
International Search Report for International Patent Application No. PCT/US2010/039768, dated Feb. 23, 2011, 3 pages.
International Search Report for International Patent Application No. PCT/US2011/033194, dated Nov. 28, 2011, 3 pages.
International Search Report for International Patent Application No. PCT/US2011/040218, dated Feb. 17, 2012, 3 pages.
International Search Report for International Patent Application No. PCT/US2012/046386 dated Oct. 5, 2012; 2 pages.
Khalafallah, A., "Neural network based model for predicting housing market performance." Tsinghua Science and Technology, vol. 13, No. S1, pp. 325-328, Oct. 2008.
Kiplinger Personal Finance, "Before Submitting a Home Offer, Make Sure all Bases are Covered," Jan. 2015, available at https ://www.kiplinger.com/article/real-estate/T029-COOO-SOO 1-6-ways-to-stage-your-home-for-less-than-1-000 .html (access Oct. 28, 2018).
Nuance, Power PDF How to: Create Fillable PDF Form, "How to get started, and get more out of your PDF's," 4 pages.
Rossini, P., "Application of artificial networks for the valuation of residential property." 10 pages, Jan. 1997.
Written Opinion of the International Searching Authority, PCT/US2008/070566, dated Feb. 19, 2009, 4 pages.
Written Opinion of the International Searching Authority; PCT/US2012/046386; dated Oct. 5, 2012; 7 pages.
U.S. Appl. No. 15/135,398 for Allison, filed Apr. 21, 2016.
U.S. Appl. No. 16/911,122 for Allison, filed Jun. 24, 2020.
U.S. Appl. No. 17/194,651 for Allison, filed Mar. 8, 2021.

\* cited by examiner

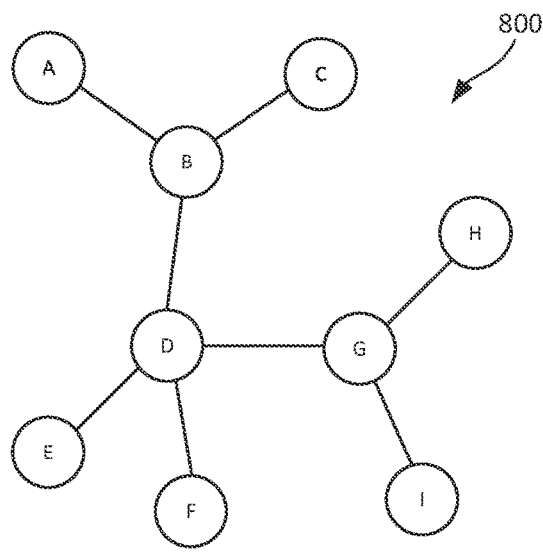
FIG. 8A
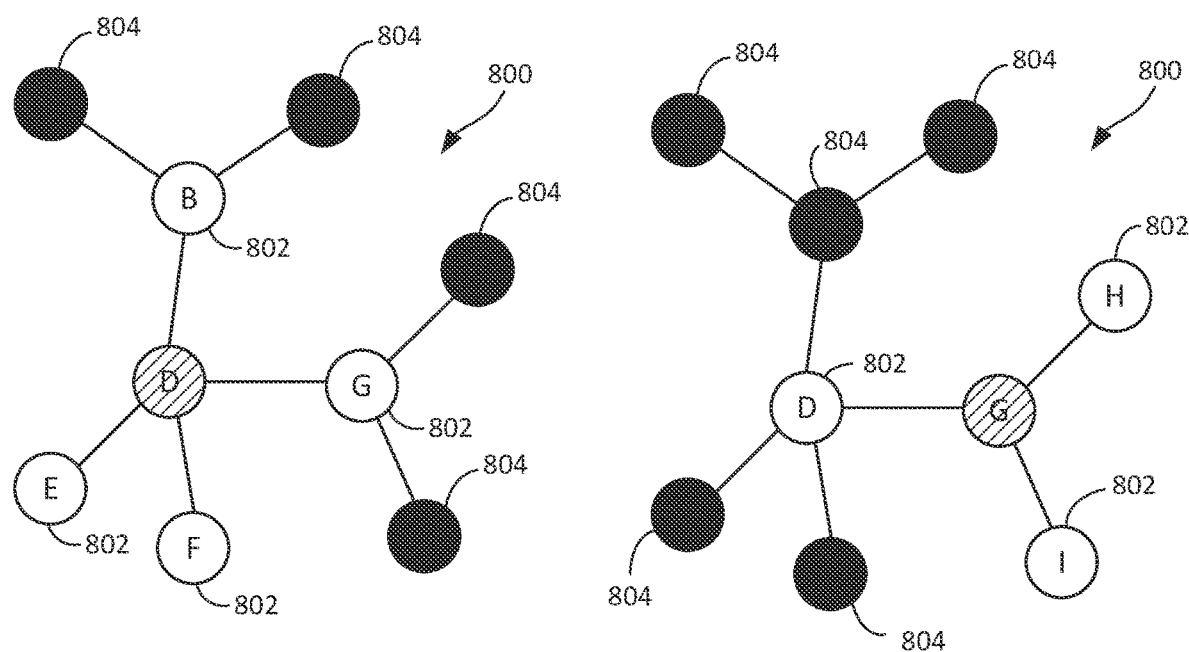
FIG. 8B
FIG. 8C

ELECTRONIC CONTENT SHARING

CROSS-REFERENCE TO RELATED APPLICATION(S)

This application is a continuation of U.S. patent application Ser. No. 17/022,644 entitled "ELECTRONIC CONTENT SHARING," filed Sep. 16, 2020, which is a continuation of U.S. patent application Ser. No. 14/177,656 (now U.S. Pat. No. 10,826,951) entitled "ELECTRONIC CONTENT SHARING," filed Feb. 11, 2014, which claims priority to U.S. Provisional Patent Application No. 61/875,352 entitled "ELECTRONIC CONTENT SHARING," filed Sep. 9, 2013, and U.S. Provisional Patent Application No. 61/763,278 entitled "ELECTRONIC CONTENT SHARING," filed Feb. 11, 2013, the disclosures of which are all incorporated herein by reference in their entireties.

TECHNICAL FIELD

The systems and methods described below relate generally to the field of electronic content, and, more specifically, the systems and methods described below relate to the field of regulating access to shared electronic content.

BACKGROUND

Due in part to the proliferation of networked computing environments, electronic content in the form of documents, agreements, forms and like are increasingly transmitted between parties in electronic format. As the number of parties grows and the complexity of the interaction increases, there exists a need to manage and control the exchange of such electronic content.

SUMMARY

In an embodiment, the present disclosure is directed, in part, to a computer-based method of sharing electronic content. The method comprises receiving, by an electronic content sharing system, electronic content, wherein the electronic content is associated with an originator and an electronic action. The method also comprises receiving, by the electronic content sharing system, a set of recipients, wherein the set of recipients are each to individually perform the electronic action. The method also comprises providing, by the electronic content sharing system, the electronic content to the set of recipients, wherein the provided content comprises a request to perform the electronic action. When the electronic action is performed by a first subset of the set of recipients, the electronic content is updated by the electronic content sharing system to reflect the performed electronic action, the updated electronic content is provided to the originator by the electronic content sharing system, and the updated electronic content is provided to a second subset of the set of recipients by the electronic content sharing system.

In an embodiment, the present disclosure is directed, in part, to an electronic content sharing computing system for sharing electronic content between a plurality of users, the electronic content sharing computing system comprising one or more processors and one or more memory units. The one or more processors are configured to store a first electronic document received from a first user, wherein the first electronic document comprises first metadata identifying a first originator indicator, wherein the first originator indicator identifies the first user and a first recipient list, wherein the first recipient list identifies a second user and a third user. The one or more processors are configured to share the first electronic document with the second user as a second electronic document, wherein the second electronic document comprises second metadata identifying a second originator indicator, wherein the second originator indicator identifies the second user and a second recipient list. The second recipient list is automatically populated with the first user as identified by the first originator indicator, and the third user as identified by the first recipient list. Upon completion of an electronic action by the second user, the second electronic document is automatically shared with the first user and the third user as a third electronic document.

In an embodiment, the present disclosure is directed, in part, to a computer-based method of sharing electronic content. The method comprises hosting a user workspace, wherein the user workspaces identifies an electronic document, wherein the electronic documents is selectably sharable with a plurality of workspace members and the plurality of workspace members. Each of the plurality of workspace members have access to the electronic document, wherein the user workspace is centralized around the electronic document. When the electronic document is shared with an additional party, the number of workspace members identified by the user workspace is increased.

BRIEF DESCRIPTION OF THE DRAWINGS

FIGS. 8A-8E illustrate schematic views of a collaborative environment for a network of users that is facilitated by an electronic content sharing system in accordance with a non-limiting embodiment.

DETAILED DESCRIPTION

Figure 1:
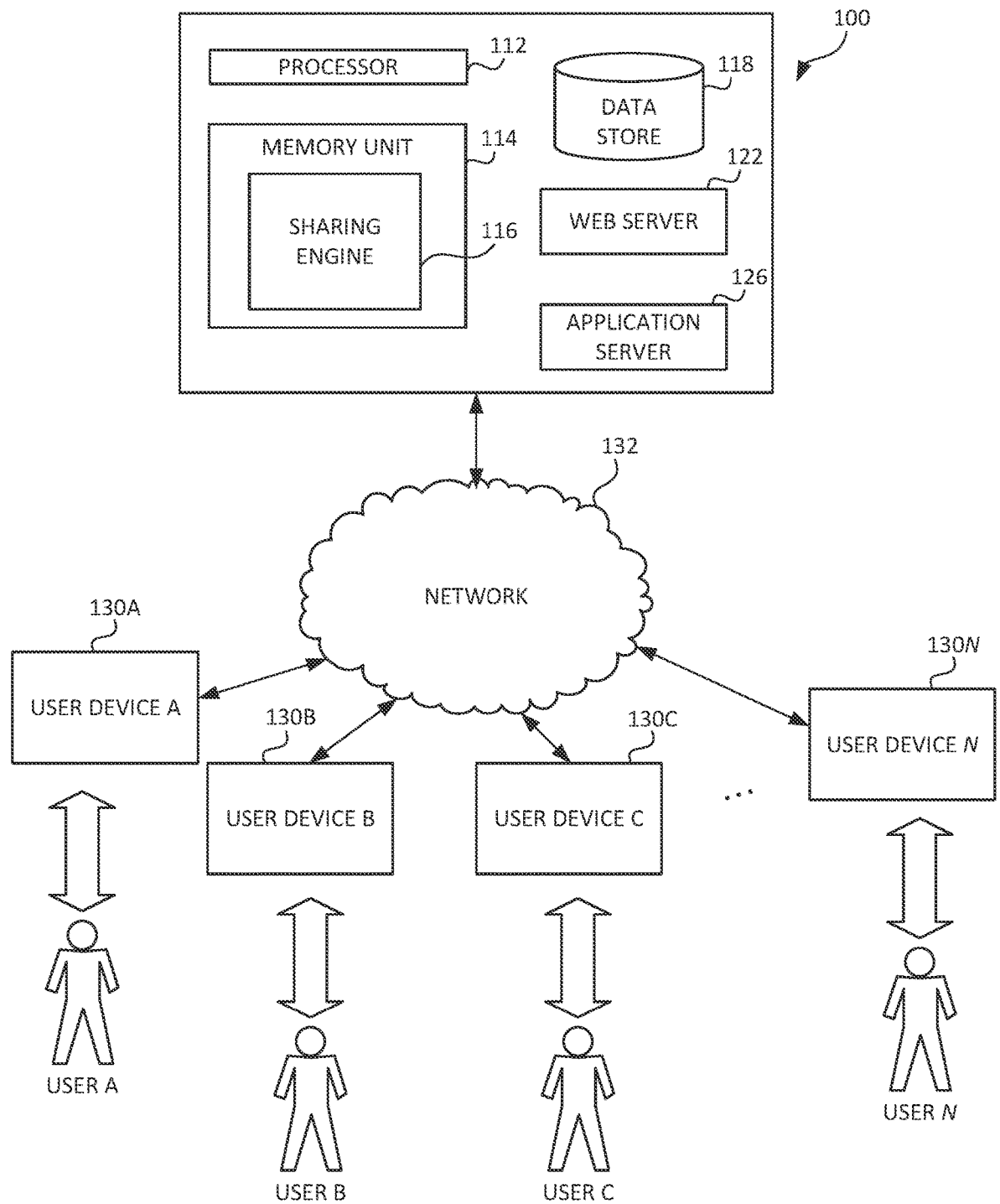
FIG. 1 depicts an example electronic content sharing system.

The systems and methods disclosed herein are described in detail by way of examples and with reference to the figures. It will be appreciated that modifications to disclosed and described examples, arrangements, configurations, components, elements, apparatuses, methods, systems, etc. can be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The systems, apparatus, and methods disclosed herein generally relate to the sharing and auto-sharing of electronic content along with regulating access of the electronic content to particular users, with selected examples disclosed and described in detail with reference made to FIGS. 1-13. The apparatuses, devices, systems and methods disclosed and described herein can be used to share a variety of electronic content, such as electronic transactional documents. Those of ordinary skill in the art will recognize that any other electronic content can be shared using the systems and methods described herein. Throughout this document, reference to particular types of electronic content is merely for pedagogical purposes and is not intended to limit the disclosure to specific embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores and computing instructions in any electronic format, firmware, and embedded software. The terms information and data are used expansively and includes a wide variety of electronic information, including but not limited to machine-executable or machine-interpretable instructions; content such as text, video data, and audio data, among others; and various codes or flags. The terms information, data, and content are sometimes used interchangeably when permitted by context. It should be noted that although for clarity and to aid in understanding some examples discussed below might describe specific features or functions as part of a specific component or module, or as occurring at a specific layer of a computing device (for example, a hardware layer, operating system layer, or application layer), those features or functions can be implemented as part of a different component or module or at a different layer.

The examples discussed below are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods can be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead can be performed in a different order or in parallel.

The figures and accompanying detailed description generally describe an application, or "app," that includes computer executable instructions capable of executing on a computing platform such as a desktop, laptop, tablet, mobile computing device, or other suitable hardware. The app can include software modules, processes, application programming interfaces or APIs, drivers, helper applications such as plug-ins, databases such as search and query databases, and other types of software modules or computer programming as would be understood in the art.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics can be combined in any suitable manner in one or more embodiments.

The presently disclosed embodiments are generally directed to the transferring of electronic content, such as virtual documents, between many different users that are virtually connected. This virtual connection can be based on, for example, a user's involvement with an online transaction, or other type of association between the users. Similar to commonly-used social networks, a first user may have a plurality of first degree connections, with each of those first degree connections having a plurality of connections. Those plurality of connections of each of the first degree connections can be considered second degree connections of the first user. It follows that the first user can be connected (directly or indirectly) to a large network of users. One of the uses of such a network is to share and collaborate, which can rely on the sharing of electronic content between various users within the network. The systems and methods described in more detail below generally relate to controlling the access to various forms of electronic content and controlling the virtual flow path of the electronic content through the network of users. In some embodiments, electronic content that is shared with a first group of users is automatically shared with a second group of users upon the satisfaction of one or more conditions.

By way of example, such systems and methods can be used during an online transaction that is facilitated by an online or virtual transaction platform. Such transaction could include negotiations and the exchanging terms sheets, contracts, or other content conveyed to various users in electronic format. As the transaction progresses the type of content being shared can change, as well as the particular users that need to interact with that content. Additionally, as the number of parties to the transaction increases, the process for regulating control and access to that content can become complex, especially if it is desired to limit access to the content.

In some example embodiments, content is shared by an originator to a number of users on a recipient list. The originator can, for example, selectively determine the users to include in the recipient list. In the case of an online transaction, the content can be a virtual document that is to be electronically signed by each user on the recipient list. In a real estate context, for example, the originator can be a realtor and the users on the recipient list can be buyers of real estate. When one of the buyers electronically signs the document, the system shares the signed document with the realtor and the other parties that originally received the document (i.e., the other buyers). Therefore, access to the updated content (i.e., a signed transactional document) can be limited to a subset of users that is determined based on the recipients of the originally shared content. It is noted that the determination of which party receives the signed document is not necessarily based on assigned roles of the parties, but instead the system can look to the original recipient list of the shared content. In fact, in some embodiments, the systems and methods described herein are agnostic to the particular roles of the particular users, and instead sharing decisions are made based purely on the share paths of the content.

Referring now to FIG. 1, one example embodiment of the present disclosure can comprise a computer-based electronic content sharing system 100 that generally controls the sharing of electronic content. The electronic content sharing system 100 can be a component of, or otherwise associated with, other computer-based systems, such as systems for facilitating online transactions, social networking systems, payment platforms, and so forth. In one example embodiment, the electronic content sharing system 100 is associated with the interactive real estate contract and negotiation tool described in U.S. Patent Application Publication No. 2010/0100522, the entirety of which is incorporated herein by reference. In any event, the electronic content sharing system 100 can be provided using any suitable processor-based device or system, such as a personal computer, laptop, server, mainframe, or a collection (e.g., network) of multiple computers, for example. The electronic content sharing system 100 can include one or more processors 112 and one or more computer memory units 114. For convenience, only one processor 112 and only one memory unit 114 are shown in FIG. 1. The processor 112 can execute software instructions stored on the memory unit 114. The processor 112 can be implemented as an integrated circuit (IC) having one or multiple cores. The memory 114 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 114 can store executable software and data for a sharing engine 116. When the processor 112 of the electronic content sharing system 100 executes the software of the sharing engine 116, the processor 112 can be caused to perform the various operations of the electronic content sharing system 100, such as monitor the sharing of electronic content, store additional versions of electronic content, and auto share electronic content, as discussed in more detail below. Data used by the sharing engine 116 can be from various sources, such as a data store 118, which can be an electronic computer database, for example. The data stored in the data store 118 can be stored in a non-volatile computer memory, such as a hard disk drive, a read only memory (e.g., a ROM IC), or other types of non-volatile memory. Also, the data of the data store 118 can be stored on a remote electronic computer system, for example.

The electronic content sharing system 100 can be in communication with user devices 130A-N via an electronic communications network 132. The communications network 132 can include a number of computer and/or data networks, including the Internet, LANs, WANs, GPRS networks, etc., and can comprise wired and/or wireless communication links. The user devices 130A-N that communicate with the electronic content sharing system 100 can be any type of client device suitable for communication over the network 132, such as a personal computer, a laptop computer, a tablet computer, or a netbook computer, for example. In some example embodiments, a user can communicate with the network 132 via a device 130 that is a combination handheld computer and mobile telephone, sometimes referred to as a smart phone. It can be appreciated that while certain embodiments can be described with users communicating via a smart phone or laptop by way of example, the communication can be implemented using other types of user equipment or wireless computing devices such as a mobile telephone, personal digital assistant (PDA), combination mobile telephone/PDA, handheld device, mobile unit, subscriber station, game device, messaging device, media player, pager, or other suitable mobile communications devices.

The user devices 130A-N can provide a variety of applications for allowing a user to accomplish one or more specific tasks using the electronic content sharing system 100. Applications can include, without limitation, a web browser application (e.g., INTERNET EXPLORER, MOZILLA, FIREFOX, SAFARI, OPERA, NETSCAPE NAVIGATOR) telephone application (e.g., cellular, VoIP, PTT), networking application, messaging application (e.g., e-mail, IM, SMS, MMS, BLACKBERRY Messenger), contacts application, calendar application and so forth. The user device 130 can comprise various software programs such as system programs and applications to provide computing capabilities in accordance with the described embodiments. System programs can include, without limitation, an operating system (OS), device drivers, programming tools, utility programs, software libraries, application programming interfaces (APIs), and so forth. Exemplary operating systems can include, for example, a MICROSOFT OS, APPLE OS, UNIX OS, LINUX OS, and others.

In general, an application, such as a web browsing application, can provide a user interface to communicate information between the electronic content sharing system 100 and the users via the user devices 130A-N. The user devices 130A-N can include various components for interacting with the application such as a display for presenting the user interface and a keypad for inputting data and/or commands. The user devices 130A-N can include other components for use with one or more applications such as a stylus, a touch-sensitive screen, keys (e.g., input keys, preset and programmable hot keys), buttons (e.g., action buttons, a multidirectional navigation button, preset and programmable shortcut buttons), switches, a microphone, speakers, an audio headset, a camera, and so forth. Through the interface, the users can interact with the electronic content sharing system 100 (e.g., to share content, to review content, to perform actions related to the content, and so forth).

The applications can include or be implemented as executable computer program instructions stored on computer-readable storage media such as volatile or non-volatile memory capable of being retrieved and executed by a processor to provide operations for the user devices 130A-N. The memory can also store various databases and/or other types of data structures (e.g., arrays, files, tables, records) for storing data for use by the processor and/or other elements of the user devices 130A-N.

As shown in FIG. 1, the electronic content sharing system 100 can include several computer servers and databases. For example, the electronic content sharing system 100 can include one or more web servers 122 and application servers 126. For convenience, only one web server 122 and one application server 126 are shown in FIG. 1, although it should be recognized that the invention is not so limited. The servers 122, 126 can comprise processors (e.g., CPUs), memory units (e.g., RAM, ROM), non-volatile storage systems (e.g., hard disk drive systems), etc.

The web server 122 can provide a graphical web user interface through which users of the system can interact with the electronic content sharing system 100. The web server 122 can accept requests, such as HTTP requests, from clients (such as web browsers on the user devices 130A-N), and serve the clients responses, such as HTTP responses, along with optional data content, such as web pages (e.g., HTML documents) and linked objects (such as images, etc.).

The application server 126 can provide a user interface for users who do not communicate with the electronic content sharing system 100 using a web browser. Such users can have special software installed on their user devices 130A-N that allows them to communicate with the application server 126 via the network 132. Such software can be downloaded, for example, from the electronic content sharing system 100, or other software application provider, over the network to such user devices 130A-N.

Although FIG. 1 depicts a limited number of elements for purposes of illustration, it can be appreciated that the electronic content sharing system 100 can include more or less elements as well as other types of elements in accordance with the described embodiments. Elements of the electronic content sharing system 100 can include physical or logical entities for communicating information implemented as hardware components (e.g., computing devices, processors, logic devices), executable computer program instructions (e.g., firmware, software) to be executed by various hardware components, or combination thereof, as desired for a given set of design parameters or performance constraints.

The types or roles of Users A-N shown in FIG. 1 that interact with the electronic content sharing system 100 can vary. The type of user can depend, for example, on the type of transaction or underlying event that connects the Users A-N. By way of example, for a real estate transaction, the Users A-N can include one or more lenders, one or more real estate agents, one or more buyers, and one or more sellers.

Figure 2:
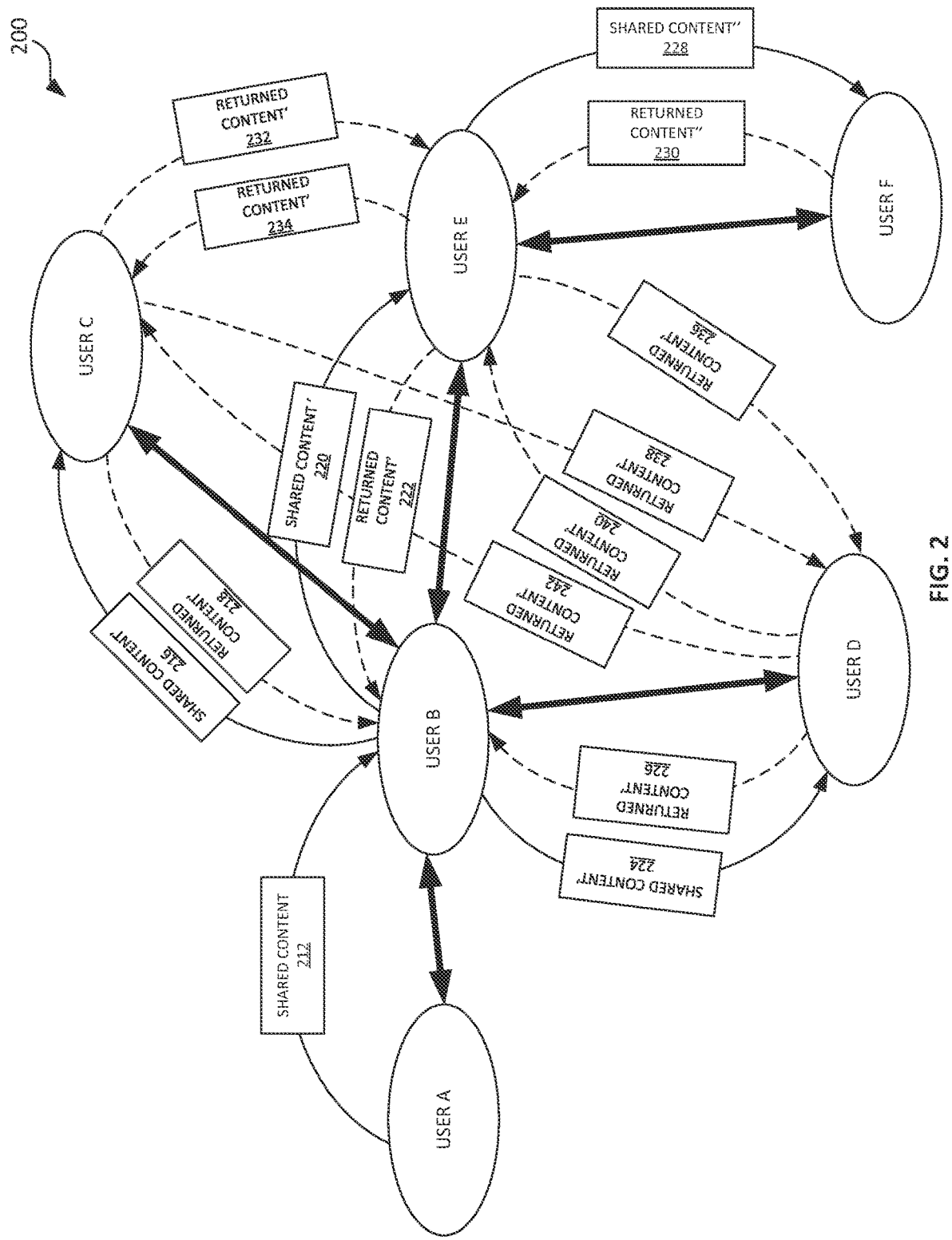
FIG. 2 depicts an example network of users engaged in a content sharing network.

FIG. 2 depicts an example network of users 200 engaged in a content sharing network. The Users A-F can be engaged in any type of online transaction or event in which it is desired to share electronic content. The Users A-F in FIG. 2 can be interacting with the content sharing system 100 (FIG. 1) via user devices, such as laptops, smart phones, tablet computers, and so forth. The content sharing system 100 in FIG. 1 can facilitate and control the flow of share content through the network of users. As such, access to any particular shared content can be regulated so that only particular users (i.e., a subset of the total number of users) can view and/or alter the content. Merely for the purposes of explanation, the sharing of content in FIG. 2 will be described in the context of a real estate transaction. It is to be appreciated that the systems and methods described herein are not to be limited to any particular field or endeavor, but instead can be used in any suitable networked environment in which it is desired to selectively share electronic content amongst a network of users.

FIG. 2 generally depicts the flow paths of electronically shared content through the network of users. The electronically shared content can require a specific action by the recipient, such as an electronic signature. Other example actions can include agreeing to terms and conditions or supplying information. Upon completion of the specific action, returned content is shared with particular recipients. The sharing of the returned content in FIG. 2 can be considered automatic, as the user that completed the requisite action that is associated with the shared content does not necessarily have to choose the recipients of the returned content. Instead, the content sharing system 100 can determine the appropriate recipients based on the recipients of the originally shared content.

In the illustrated embodiment, User A is a lending institution which supplies shared content 212 to User B. For this example, the shared content 212 is a real estate sales contract and User B is a buyer's agent. Users C, D and E are buyers of real estate. User B shares content to Users C, D, and E, as illustrated by shared content' 216, 224, 220, respectively. The shared content' 216, 224, 220 in this example is the real estate sales contract that each User C, D, and E needs to electronically sign. Referring first to User C, upon signing the document (or taking any other action associated with the electronic content), the returned content' is shared with the originator as well as the other recipients of the shared content'. Thus, returned content' 218 is shared with User B, returned content' 238 is shared with User D and returned content' 232 is shared with User E, thereby informing each User B, D, and E that User C has electronically signed the real estate sales contract. User D's interaction with the system is similar to User C, since when User D completes the action associated with the shared content' 224, the returned content' 226, 242, 240 is shared with User B, User C, and User E, respectively.

In the illustrated embodiment User E also shares the shared content' 220 with User F, as shown by shared content'' 228. User F can be, for example, an attorney that User E wants to review the sales contract. Once User F satisfies the requisite action associated with the shared content'' 228, the returned content'' 230 is shared with User E. It is noted that the returned content'' 230 is not shared with any other users, since User F was the only user to receive the originally shared content'' 228. With regard to action requested with the shared content' 220, when User E completes that action, the returned content' 222, 234, 236 is shared with User B, User C, and User D, respectively.

Figure 3:
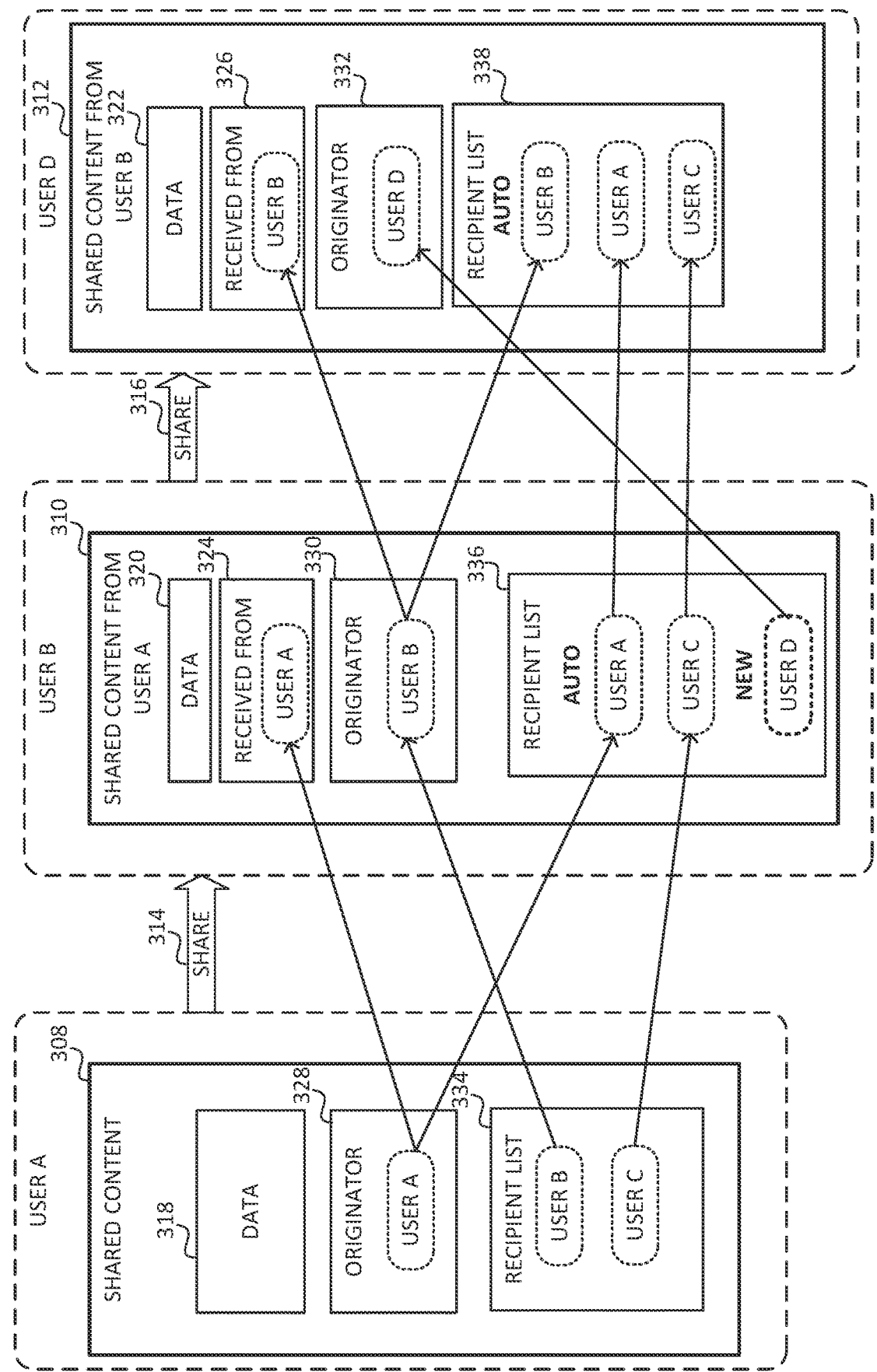
FIG. 3 schematically illustrates example data which can be associated with shared content in accordance with one non-limiting embodiment.

FIG. 3 schematically illustrates example data, sometimes referred to as metadata, which can be associated with shared content in accordance with one non-limiting embodiment. Electronic document 308 is under the control of User A. The electronic document 308 comprises data 318, an originator field 328, and a recipient list 334. The originator field 328 indicates that User A is the originator of the shared content. User B and User C are shown as the recipients of the shared content, which could have been auto populated based on the shared content, as described below, or selected by User A. The electronic document 308 is shared at 314 to User B as electronic document 310 so that User B has the ability to access and interact with the electronic document. It is to be appreciated that although it is not illustrated, the electronic document 308 was also shared with User C. In addition to data 320, the electronic document 310 comprises metadata used to determine the flow path of the electronic document 310 upon completion of the requisite action. A field 324 indicates that the electronic document 310 was received from User A and an originator field 330 indicates that User B is the originator of this electronic document. A recipient list 336 includes a number of users that are automatically populated and also includes new recipients, as selected by User B. In the illustrated embodiment, the recipients that were automatically populated include User A (the originator of this shared content) and User C (the other recipient of the shared content from User A). User D is indicated by User B as a new recipient of the electronic document 310. At 316 the electronic document 310 is shared with User D as electronic document 312. In addition to data 322, the electronic document 312 comprises metadata used to determine the flow path of the electronic document 312. A field 326 indicates that the electronic document 312 was received from User B, an originator field 332 indicates that User D is the originator of this electronic document. A recipient list 338 includes a number of users that are automatically populated. As shown, the recipients that were automatically populated include User B (the originator of this shared content) as well as User A and User C (the other recipients of the shared content from User B).

Figure 4:
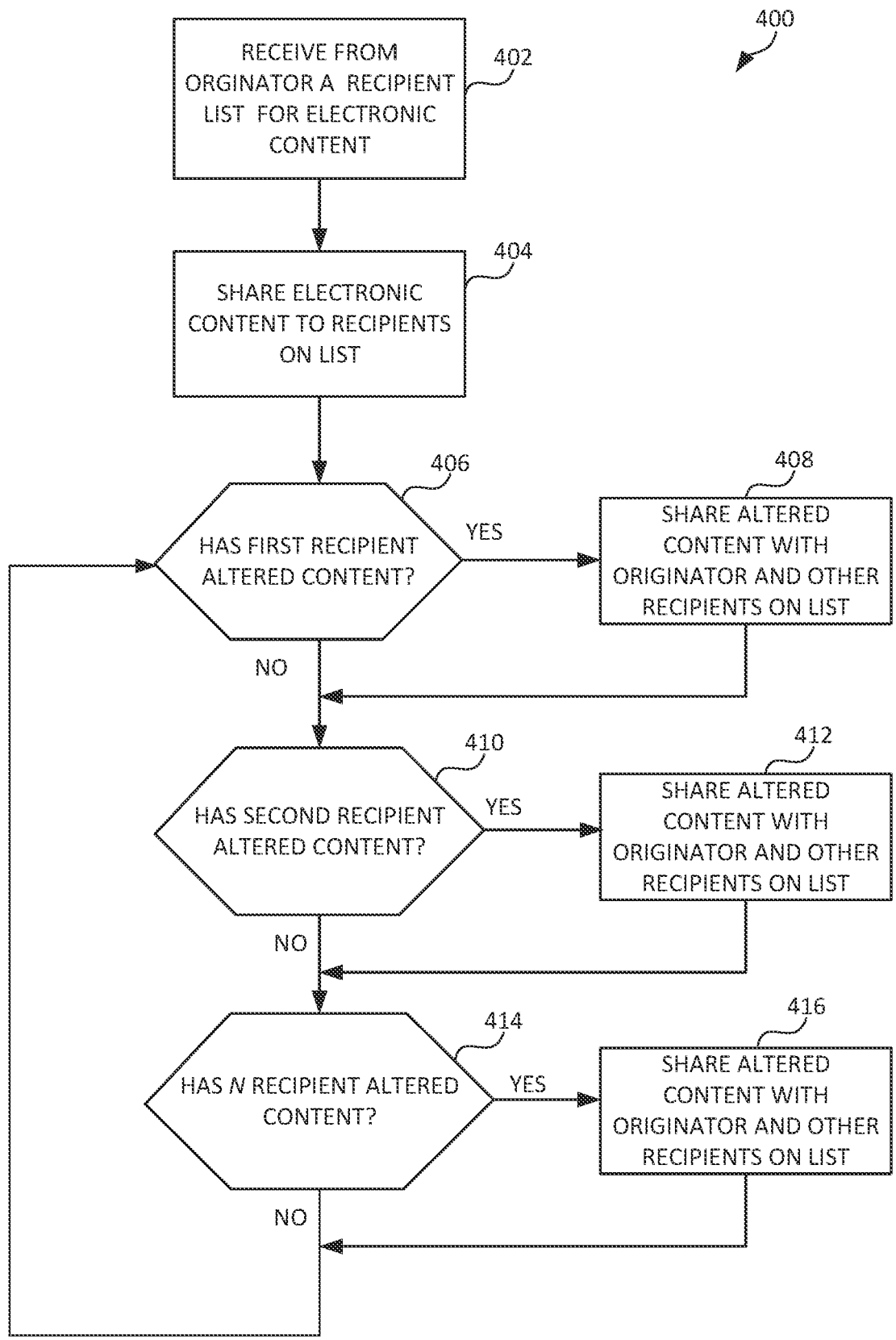
FIG. 4 depicts an example process flow which can be implemented by the content sharing system of FIG. 1.

FIG. 4 depicts an example process flow 400 which can be implemented by content sharing system 100 (FIG. 1). At 402, a recipient list for electronic content is received from an originator. The recipient list can include N number of recipients. At 404, the electronic content is shared with the recipients on the list. Subsequent to sharing the electronic content, the content sharing system 100 can monitor the electronic content to determine if the content has been altered (i.e., an electronic signature has been provided or other action satisfied). At 406, for example, it is determined if the first recipient has altered the content. If yes, at 408, the altered content is shared with the originator and the other recipients on the recipient list that was received at 402. If no, the process continues to 410, where it is determined if the second recipient has altered the content. If yes, at 412, the altered content is shared with the originator and the other recipients on the recipient list that was received at 402. If no, the process continues to 414, where it is determined if the recipient N has altered the content. If yes, at 416, the altered content is shared with the originator and the other recipients on the recipient list that was received at 402. If no, the process continues to 406 to monitor for changes to electronic content.

Figure 5:
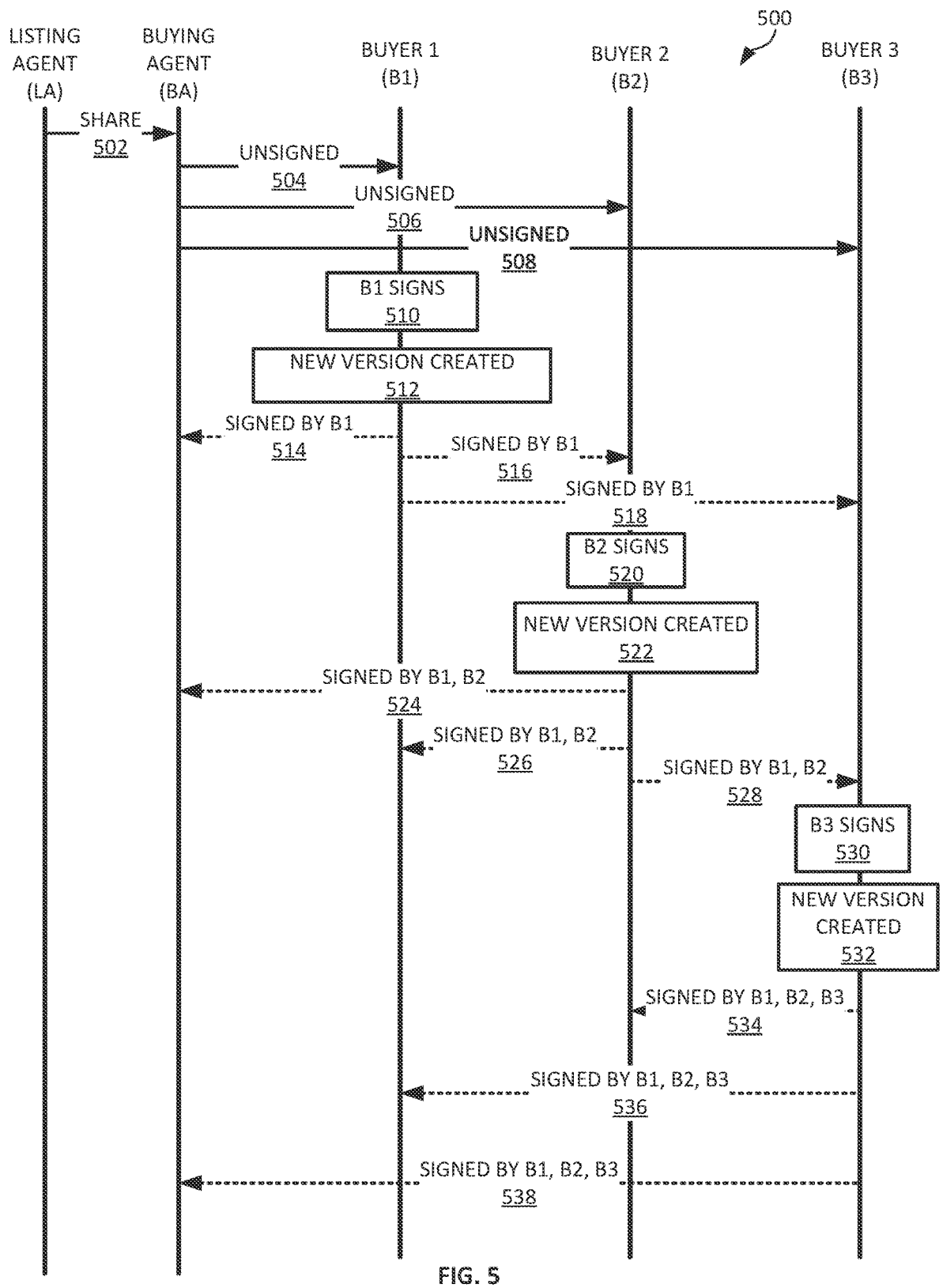
FIGS. 5-7 are example message flow diagrams.

FIG. 5 is an example message flow diagram 500 depicting an example message flow for a real estate transaction. A variety of users are party to the transaction, including a listing agent (LA), a buying agent (BA), a first buyer (B1), a second buyer (B2), and a third buyer (B3). At 502, electronic content is shared with the BA from the LA. This electronic content can be, for example, a sales contract, disclosure forms, or lending forms. Since the electronic content in this illustrative embodiment requires a signature from each buyer, at 504, 506, and 508 the unsigned electronic content is shared with B1, B2, and B3, respectively, by the BA.

B1 is the first to sign the document, indicated by signature 510. At 512 a new version of the electronic content is stored that includes the signature of B1. This new version can be stored in data store 118 (FIG. 1), for example. The system can then automatically share the signed version of the electronic content with BA (the originator) as well as B2 and B3 (the other recipients of the originally shared content) at 514, 516, and 518, respectively.

B2 is next to sign the document, indicated by signature 520. As such, the electronic document now contains the electronic signature of B1 and B2. At 522, a new version of the electronic content is stored that includes the signature of B1 and B2 and the system automatically shares the signed version of the electronic content with BA (the originator) as well as B1 and B3 (the other recipients of the originally shared content) at 524, 526, and 528, respectively.

B3 is next to sign the document, indicated by signature 530. As such, the electronic document now contains the electronic signature of B1, B2 and B3. At 532 a new version of the electronic content is stored that includes the signature of B1, B2 and B3 and the system automatically shares the signed version of the electronic content with BA (the originator) as well as B1 and B2 (the other recipients of the originally shared content) at 538, 536, and 534, respectively.

In some embodiments, the sharing of the signed documents at 514, 516, 518, 524, 526, 528, 534, 536, and 538 automatically occurs subsequent to the completion of a particular action (i.e., the providing of an electronic signature). Thus, this type of sharing is sometimes referred to as "boomeranging" or "auto sharing," as the electronic content sharing system can automatically route the completed document to the appropriate parties without necessarily requiring further directives from the users to facilitate such sharing. It is noted that in the embodiments illustrated herein, the particular role of a user does not control how content is "boomeranged." Instead, the systems and methods described herein monitor the historical sharing paths of the content to determine the recipients of any autoshared content.

Figure 6:
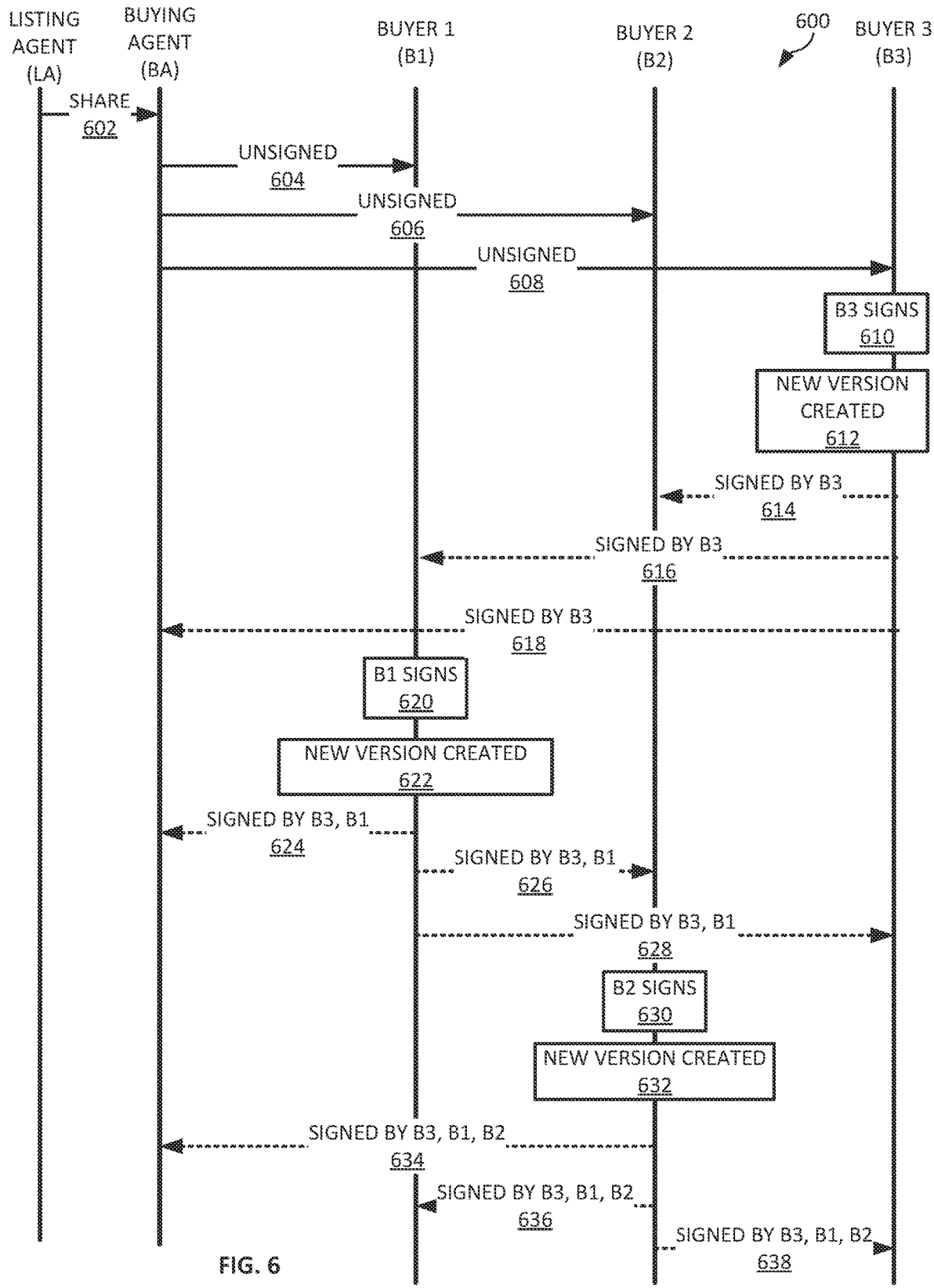

FIG. 6 is an example message flow diagram 600 depicting another example message flow for a real estate transaction. The users that are party to the transaction include the same users from FIG. 5, namely a LA, BA, B1, B2, and B3. At 602, electronic content is shared with the BA from the LA. At 604, 606, and 608 the unsigned electronic content is shared with B1, B2, and B3, respectively, by the BA.

B3 is the first to sign the document, indicated by signature 610. At 612 a new version of the electronic content is stored that includes the signature of B3 and the system automatically shares the signed version of the electronic content with BA (the originator) as well as B1 and B2 (the other recipients of the originally shared content) at 618, 616, and 614, respectively.

B1 is next to sign the document, indicated by signature 620. As such, the electronic document now contains the electronic signature of B1 and B3. At 622 a new version of the electronic content is stored that includes the signature of B1 and B3 and the system automatically shares the signed version of the electronic content with BA (the originator) as well as B2 and B3 (the other recipients of the originally shared content) at 624, 626, and 628, respectively.

B2 is next to sign the document, indicated by signature 630. As such, the electronic document now contains the electronic signature of B1, B2 and B3. At 632 a new version of the electronic content is stored that includes the signature of B1, B2 and B3 and the system automatically shares the signed version of the electronic content with BA (the originator) as well as B1 and B3 (the other recipients of the originally shared content) at 634, 636, and 638, respectively.

Figure 7:
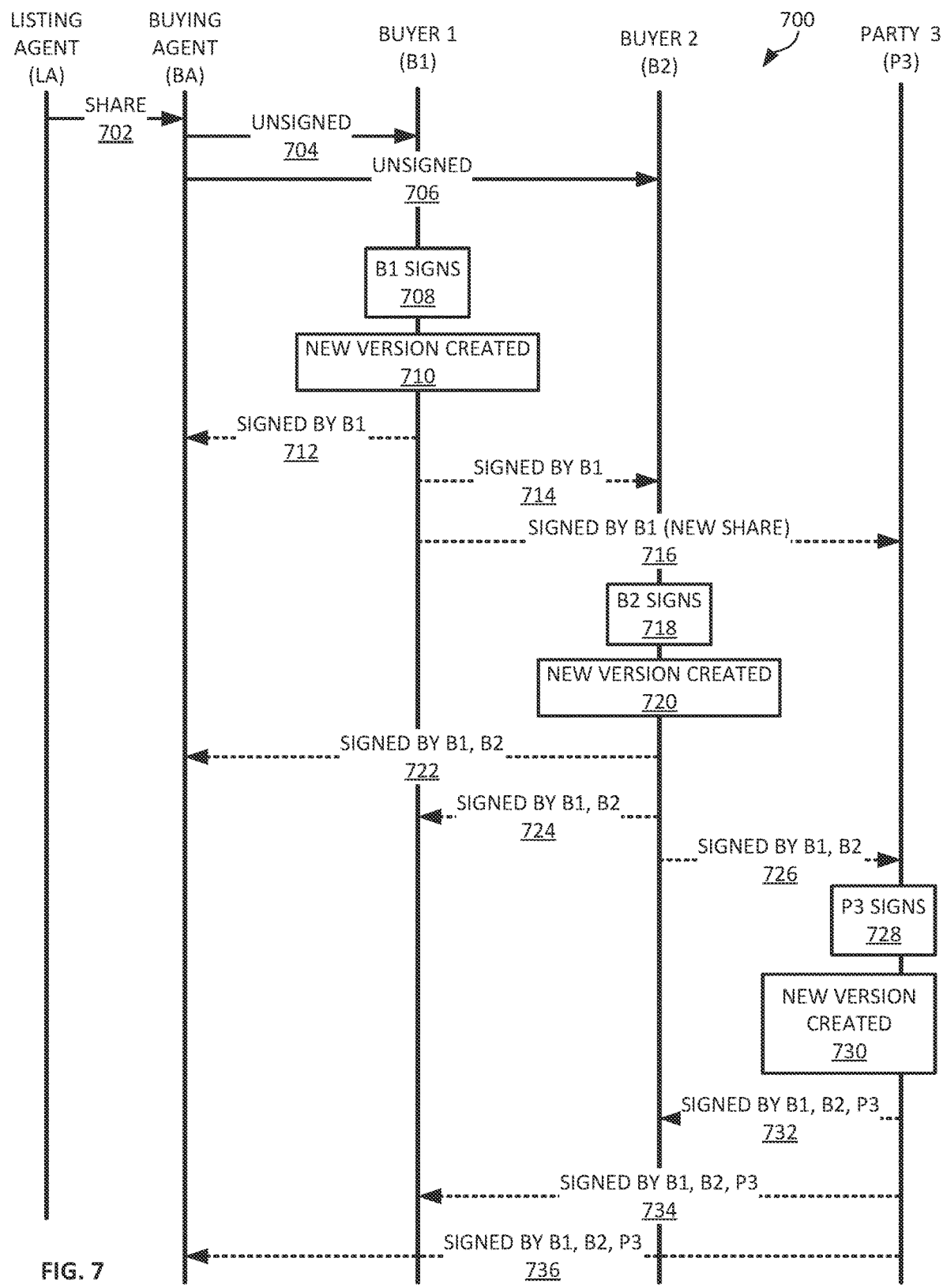

FIG. 7 is an example message flow diagram 700 depicting another example message flow for a real estate transaction. In this example embodiment, the parties to the transaction include a LA, BA, B1, B2 and a third party (P3). At 702, electronic content is shared with the BA from the LA. Since the electronic content in this illustrative embodiment requires a signature from B1 and B2, at 704 and 706 the unsigned electronic content is shared with B1 and B2, respectively, by the BA.

B1 is the first to sign the document, indicated by signature 708. At 710 a new version of the electronic content is stored that includes the signature of B1 and the system automatically shares the signed version of the electronic content with BA (the originator) as well as B2 at 712 and 714. Additionally, B1 indicates that the electronic content is to be shared with P3, as indicated by share 716.

B2 is next to sign the document, indicated by signature 718. As such, the electronic document now contains the electronic signature of B1 and B2. At 720 a new version of the electronic content is stored that includes the signature of B1 and B2 and the system automatically shares the signed version of the electronic content with BA (the originator) as well as B1 and B3 at 722, 724, and 726, respectively.

P3 is next to sign the document, indicated by signature 728. As such, the electronic document now contains the electronic signature of B1, B2 and P3. At 730 a new version of the electronic content is stored that includes the signature of B1, B2 and P3 and the system automatically shares the signed version of the electronic content with B1 (the originator) as well as BA and B2 (the other recipients of the content originally shared by B1) at 734, 734, and 732, respectively.

Computer-based electronic content sharing systems in accordance with the present disclosure, such as the computer-based electronic content sharing system 100 of FIG. 1, can be used to create, facilitate and/or host a collaborative and interactive environment for a plurality of users. In some embodiments, the users can collaborate over shared electronic content (such as electronic documents or other type of media). The electronic content sharing system can perform various functions as the users interact with the system and the shared electronic content. For example, the system can generate various notifications regarding the electronic content, maintain logs associated with the social collaboration over the electronic content, facilitate messaging among users, generate manual and/or automated tasks regarding the electronic content, as well as perform other various functions related to maintaining or tracking the collaborative environments.

The electronic content sharing system can, for example, utilize various electronic content sharing schemes, such as the sharing scheme illustrated in FIG. 2. In this regard, as electronic content is shared between users, the rules regulating the interaction with the electronic content can be generally controlled by relationships between the users. For example, in some embodiments, a user's role does not necessarily establish the various permissions of that user with regard to the shared electronic content. In other embodiments, a user can be assigned a role, but their permissions can vary for different types of electronic content.

The electronic content sharing system can host a plurality of collaborative environments, which can be referred as "loops," for users of the system. A particular loop can include a plurality of users and a variety of electronic content. For the purposes of illustration, the electronic content is largely described in the context of an electronic document, although this disclosure is not so limited. The electronic content sharing system can facilitates collaboration over a data layer of the electronic document. The data layer can be for example, negotiation terms, written content, or any other type of content that can require input, approval or inspection by a plurality of parties. In some embodiments, the electronic document remains private to a particular user until that user shares the electronic document with one or more users. Once the electronic content is shared with another user, at that point, a loop is hosted between that the users that are sharing that electronic document.

The electronic content sharing system can facilitate electronic conversations, messaging, or other forms of notifications between users. This communication may occur within an interface of the electronic content sharing system and/or it may be pushed to various electronic devices of the users, such as in the form of text messaging, multi-media messages, instant messages, and so forth. The communications and the interactions with the data layer of the electronic document may be optionally tracked as part of an audit trail associated with that particular electronic document.

In association with the shared electronic content, the electronic content sharing system can generate one or more tasks. The tasks can be supplied by a user, or may be auto-generated based on the underlying content. For example, in the context of a legal contract which requires a signature, a task can be generated associated with the required parties supplying their electronic signatures. As those parties interact with the electronic content sharing system after being invited into the appropriate loop, they can supply their signature to the electronic document.

As the various users interact with their loops, in some embodiments, logs can be generated and maintained by the electronic content sharing system. Various types of logs can be generated. For example, the log can be centric to a particular user, centric to a particular loop, centric to a particular workspace, centric to particular electronic content, centric to a particular group of users, among a variety of other types of logs.

Figure 8D:
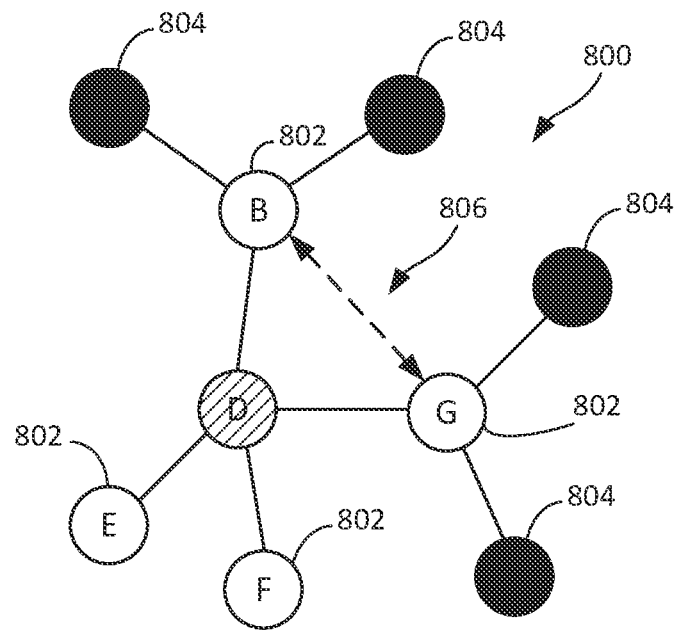

FIGS. 8A-8E illustrate schematic views of a collaborative environment for a network of users A-I, illustrated as network 800, that is facilitated by an electronic content sharing system in accordance with a non-limiting embodiment. The visibility between various users (or nodes) in the network 800 is generally regulated based on electronic invitations dispatched between various users. Referring now to FIG. 8B, from the perspective of user D, there are two types of other users in the network 800, visible users 802 and invisible users 804. As illustrated, users B, E, F and G are in loops with user D. Such loops could have been established, for example, by user D sharing electronic content with each of the users B, E, F and G. The remaining users in the network 800 are not visible to user D. By comparison, FIG. 8C is from the perspective of user G, and users D, H, and I are in a loop with user D. The remaining users in the network 800 are not visible to user D. The network 800 may continue to expand virally as the users continue to invite additional parties so they can collaborate over electronic content.

Referring now to FIG. 8D, an electronic content sharing system associated with the network 800 can be used by a user to facilitate introductions between various members of a user's loop. User B and user G are both visible to user D, but they are not visible to one another. Through interactions with the electronic content sharing system, an example of which is described in more detail below in FIG. 13, user D can "introduce" user B and user G, as indicated by introduction 806.

Figure 8E:
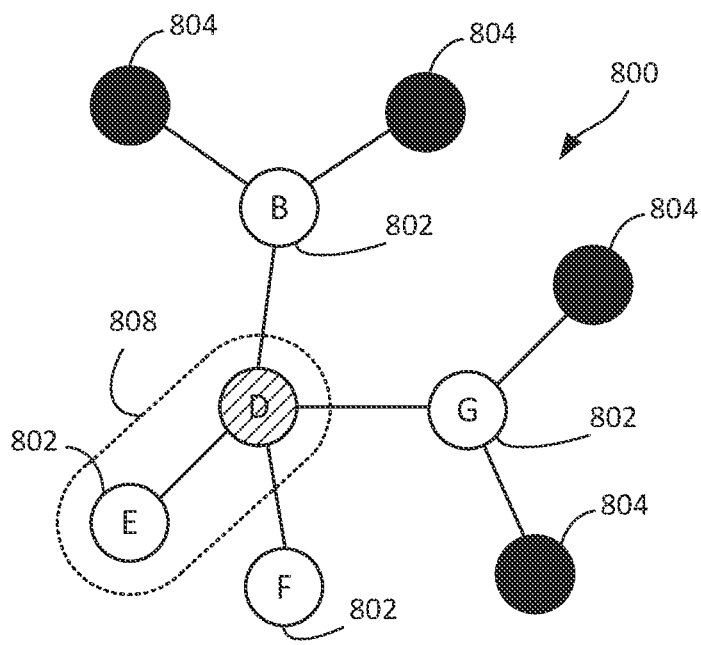

FIG. 8E illustrates that a network 800 can also include a team or group of users, with each user in the team having similar access rights. As illustrated, user D and user E are members of a team 808. Such team functionality can be useful in scenarios where a particular user, such as a real estate agent (user D), wants to delegate authority to an assistant (user E), so that the assistant can interact with user D's loops as needed.

Figure 9:
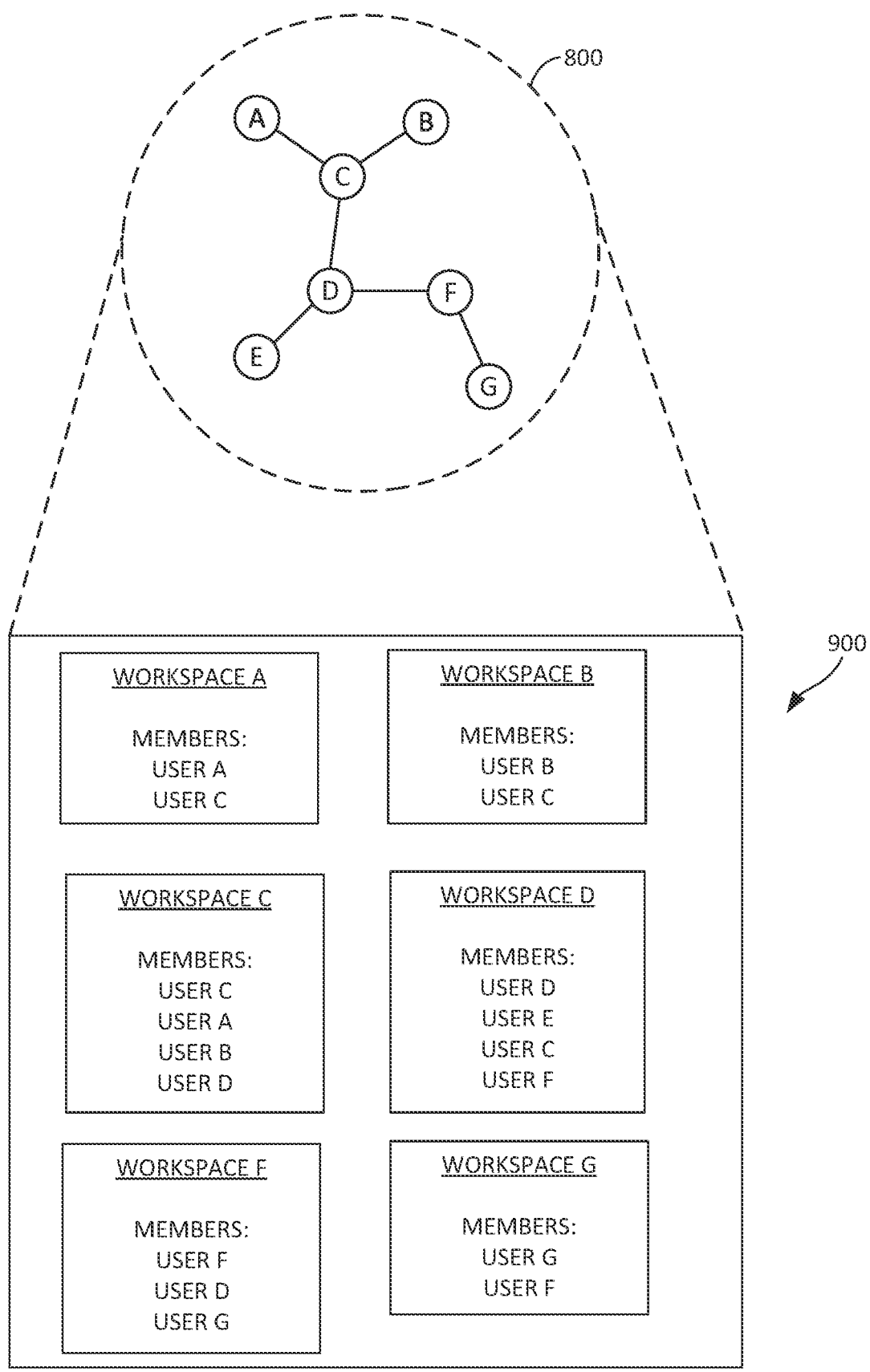
FIG. 9 illustrates a plurality of workspaces that can be maintained by an electronic content sharing system in accordance with a non-limiting embodiment.

FIG. 9 illustrates a plurality of workspaces 900 that can be maintained by an electronic content sharing system that are based on the network of users 800. As the individual users interact with their workspaces hosted by the electronic content sharing system, only certain users of the network 800, and certain electronic content, will be visible to that particular user. As is to be appreciated, the particular members of the individual workspaces may change over time as more users are invited into the workspace or leave the workspace. Workspace A is shown to have users A and C as members. Workspace B is shown to have users B and C as members. Workspace C is shown to have users C, A, B and D as members. Workspace D is shown to have users D, E, C, and F as members. Workspace F is shown to have users F, D, and G as members. Workspace G is shown to have users G and F as members.

Figure 10:
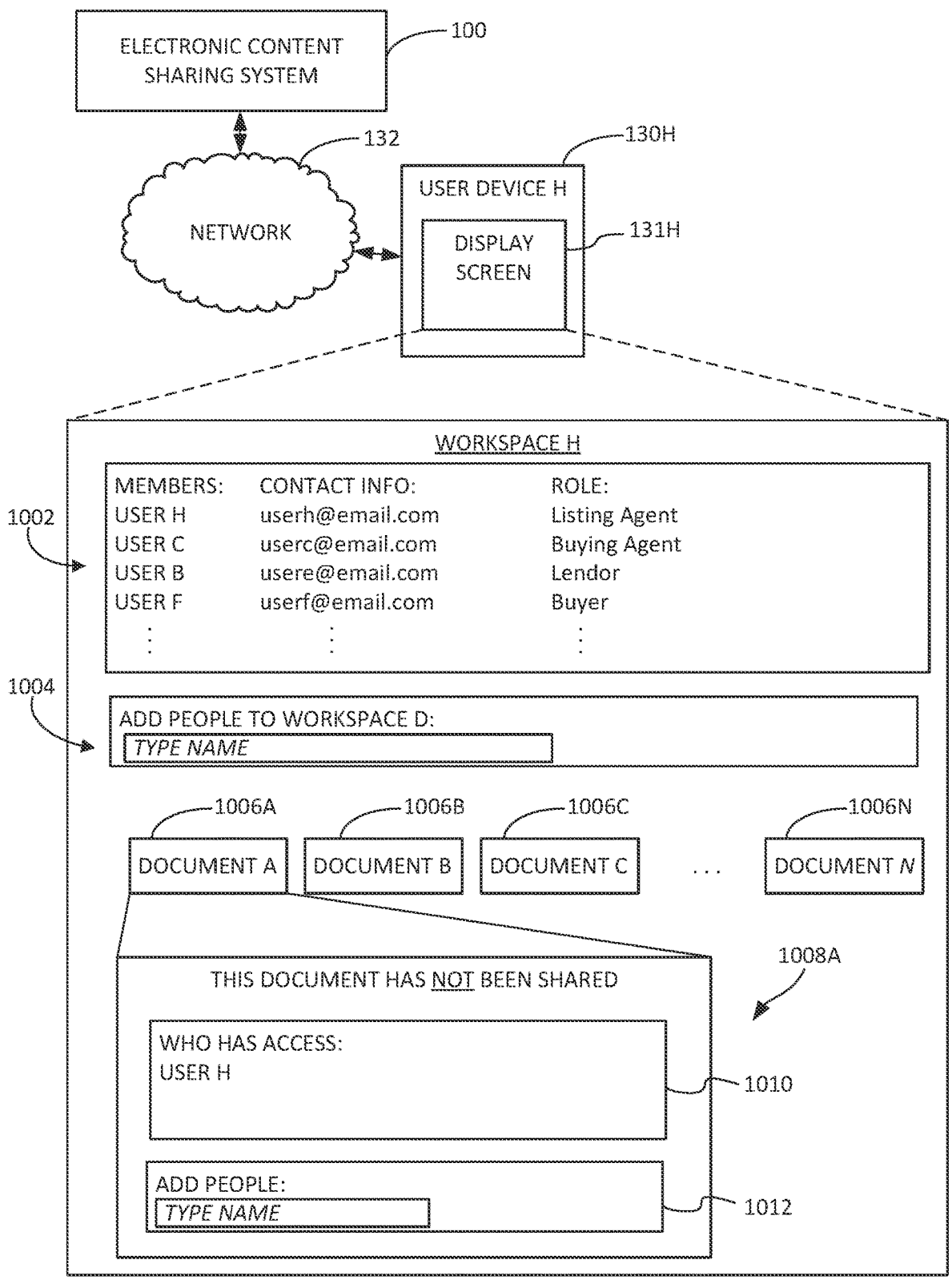
FIG. 10 illustrates a user interface on a display screen of a user in accordance with a non-limiting embodiment.

The electronic content sharing systems described herein are configured to allow users to easily share electronic content and track interactions with the shared electronic content such that a virtual collaborative environment surrounding the electronic content is created. In this regard, users of the system can optionally share content to others users, as well as access content that is received from other users. FIG. 10 illustrates an example user interface on a display screen 131H of a user device 130H for user H. The user device 130H may be similar to the user devices described above with regard to FIG. 1. As such, the user device 130H can be in communication with the network 132 and the electronic content sharing system 100. In the illustrated embodiment, the workspace H has various visual elements, such as a member portion 1002 that visually displays the members of the workspace H. The member portion 1002 can be in a list format, as illustrated, or as is to be appreciated, any other format, such as pictorial, graphical, and so forth. The member portion 1002 can include contact information for the various members, such as email addresses, and also include an indication of the member's role. In the illustrated embodiment, the workspace H is associated with a real estate agent. Accordingly, the members of the user's workspace include users associated with a particular real estate transactions, with user C being a buying agent, user B being a lender, user F being a buyer, and so forth. As is to be appreciated, however, the workspaces described herein can be utilized in any environment in which collaboration is desired. As illustrated, the workspace H also has a member addition portion 1004, which user H can interact with to add additional users to the workspace. Other workspaces can include additional interactive or visual elements without departing from the scope of the present disclosure.

The workspace H also has an electronic content repository which is used to stored electronic content on behalf of user H. In FIG. 10, the electronic content is illustrated as documents A-N. The electronic content can be selectively shared with various users of the workspace H to establish one or more loops with user H and additional users. In the illustrated embodiment, user H can select any of the documents A-N to access a sharing summary 1008A. The sharing summary 1008A indicates any users with access to that document in the access list 1010. As illustrated, no other users beside user H has access to Document A. User H can also selectively determine additional users which are to be granted access using the invitation portion 1012 of the sharing summary 1008A. Upon submitting a user's name in the invitation portion 1012, the system can dispatch an electronic invitation to the invited user. The user H can control access rights to the shared content. Example levels of access rights include view only, read/write, and so forth.

Figure 11:
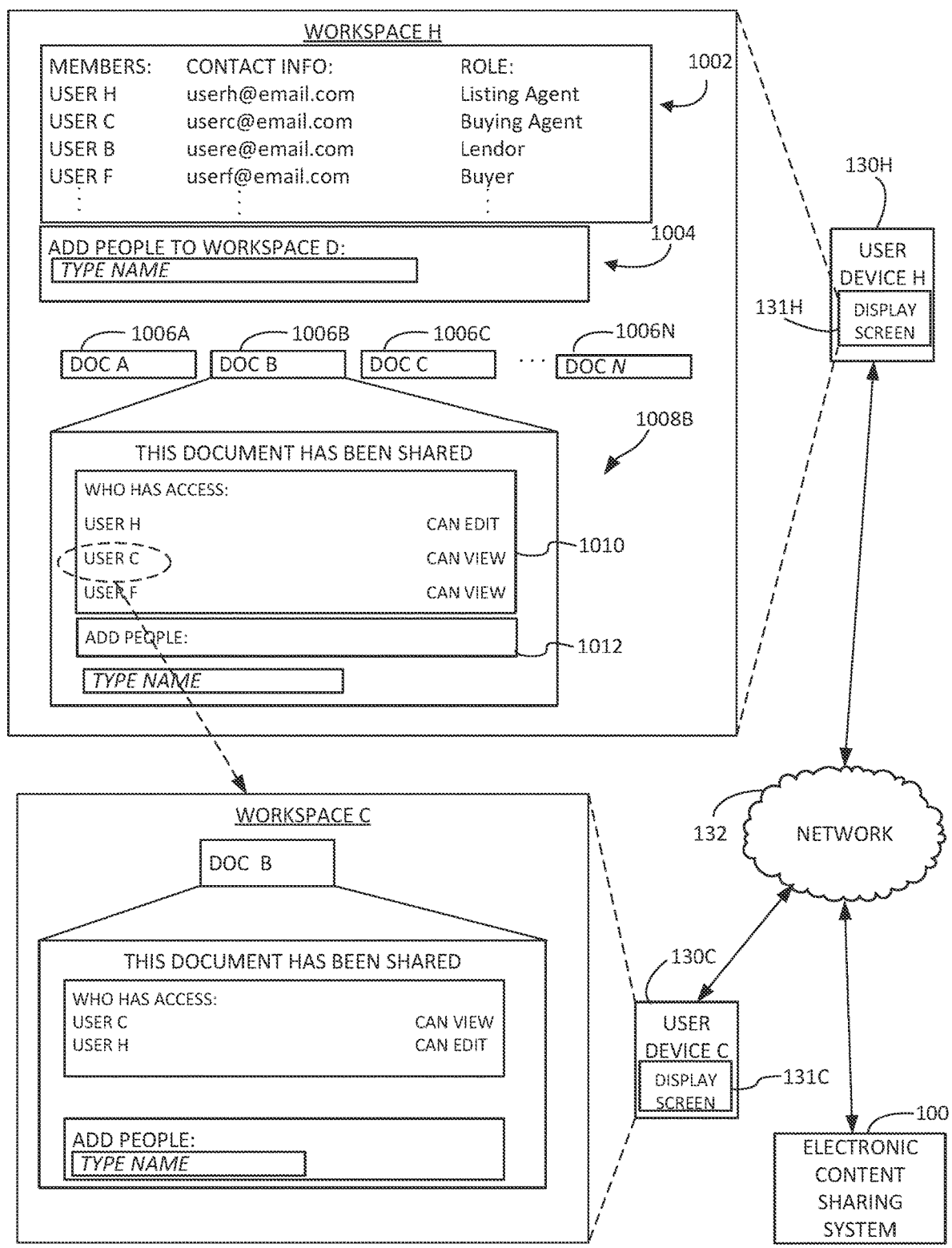
FIG. 11 illustrates an example interaction between workspaces based on user sharing a document to establish a loop between users in accordance with a non-limiting embodiment.

FIG. 11 illustrates the interaction between workspace H and workspace C based on user H sharing a document which establishes a loop between user H and user C. As illustrated, document B in the workspace H is viewable by user C and user F, as indicated by the sharing summary 1008B. Accordingly, as user C interacts with the user device C and the display screen 131C, document B is accessible through workspace C. Since user H shared the document, the sharing summary on workspace C indicates that user H and user C have access to the document B. In this embodiment, user C cannot see the other people to whom user H has shared the document B.

Figure 12:
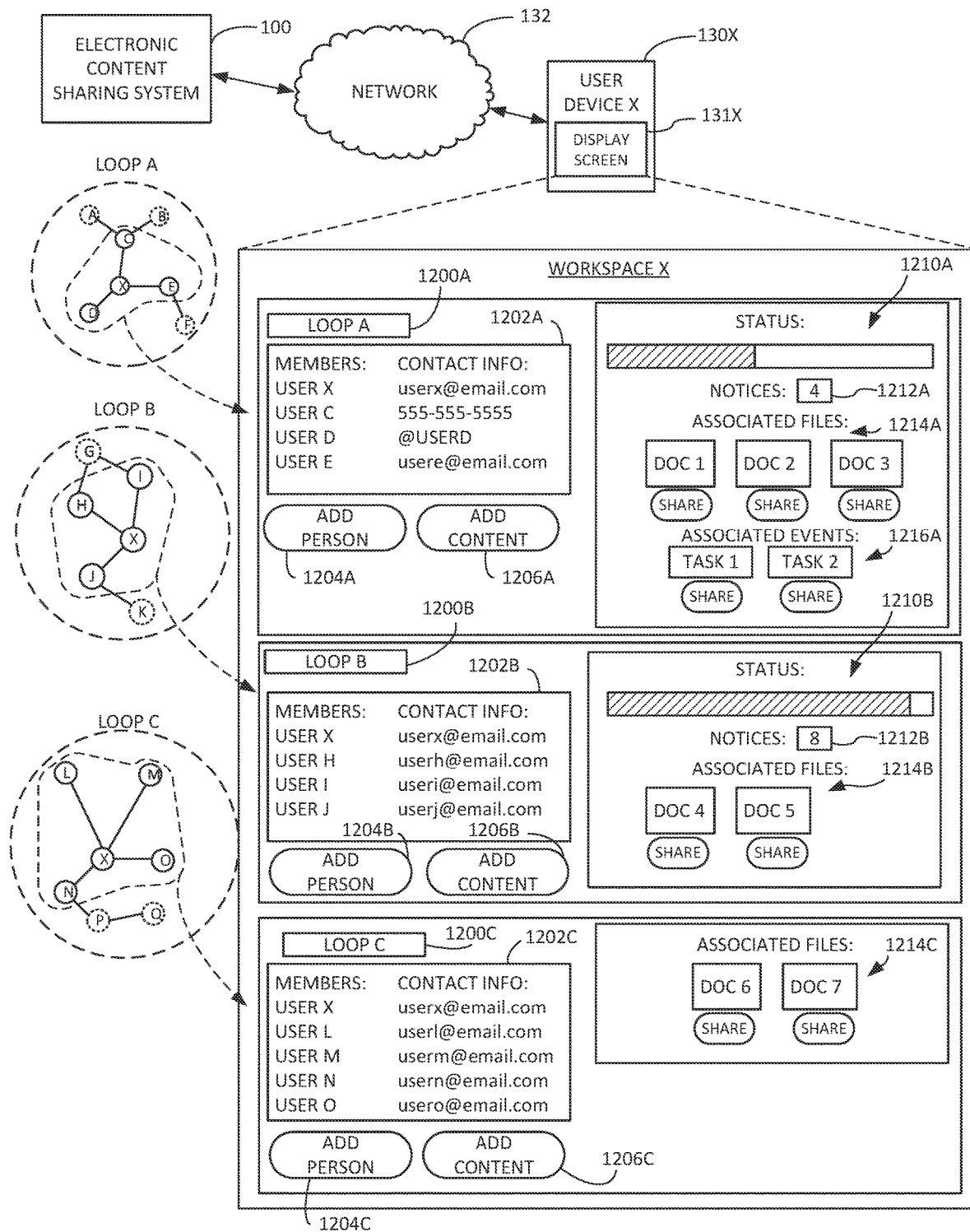
FIG. 12 illustrates a user's management of a plurality of share-centric loops via a workspace in accordance with a non-limiting embodiment.

FIG. 12 illustrates that an example user (shown as user X) can manage a plurality of share-centric loops via a workspace (shown as workspace X). The workspace X can be viewable on a display screen 131X of a user device 130X that is in communication with the electronic content sharing system 100 through the network 132. Various loops in which user X is affiliated are schematically illustrated as loops A, B and C in FIG. 12. Each loop A, B and C is summarized in the workspace X so that user X can track, maintain and interact with the individual loops. It is to be appreciated that the particular interfaces illustrated in FIG. 12 are merely example depictions of one example interface, and that a wide variety of display techniques can be used to convey the information to user X. For example, interfaces designed for display on a smart phone screen may differ aesthetically from interfaces designed for display on a tablet computer or a desktop computer. In any event, the example workspace X includes loop indicators 1200A-C. For each loop, a member portion 1202A-C is identified. In some embodiments, additional information regarding the members is provided, such as a telephone numbers, email addresses, instant message addresses, and so forth. Various control features are provided through the workspace X to assist the user X in managing the loops. Example control features include add person buttons 1204A-C and add content buttons 1206A-C. Other control features can be included. User X can invite additional people to the loop by activating an add person button 1204A-C and can add electronic content to a loop by activating the add content button 1206A-C. In the illustrated embodiment, loop A and loop B also have status windows that each include a visual status indicator 1210A and 1210B. The visual status indicator 1210A and 1210B provide an indication of a relative level of completion of certain tasks or activities associated with the loop. For example, documents within a particular loop may require four signatures. When the electronic content sharing system 100 has received two signatures, the visual status indicator associated with that loop will indicate the status as 50% complete. As illustrated, additional information regarding the loops can be included in the workspace. Example information includes notice indicators 1212A, 1212B, which indicate to user X the number of action items requiring the attention of user X. Notices can include the addition of an electronic document to the loop, a message from a user, an action item that is overdue, and so forth. Associated files 1214A, 1214B and 1214C are associated with the loop, each of which can be shared to one or more other users. In some embodiments, associated tasks 1216A can be included in the workspace that can also be selectively shared with one or more users. The associated tasks 1216A can be user defined (i.e., manual tasks) and/or system defined (i.e., automated tasks).

Figure 13:
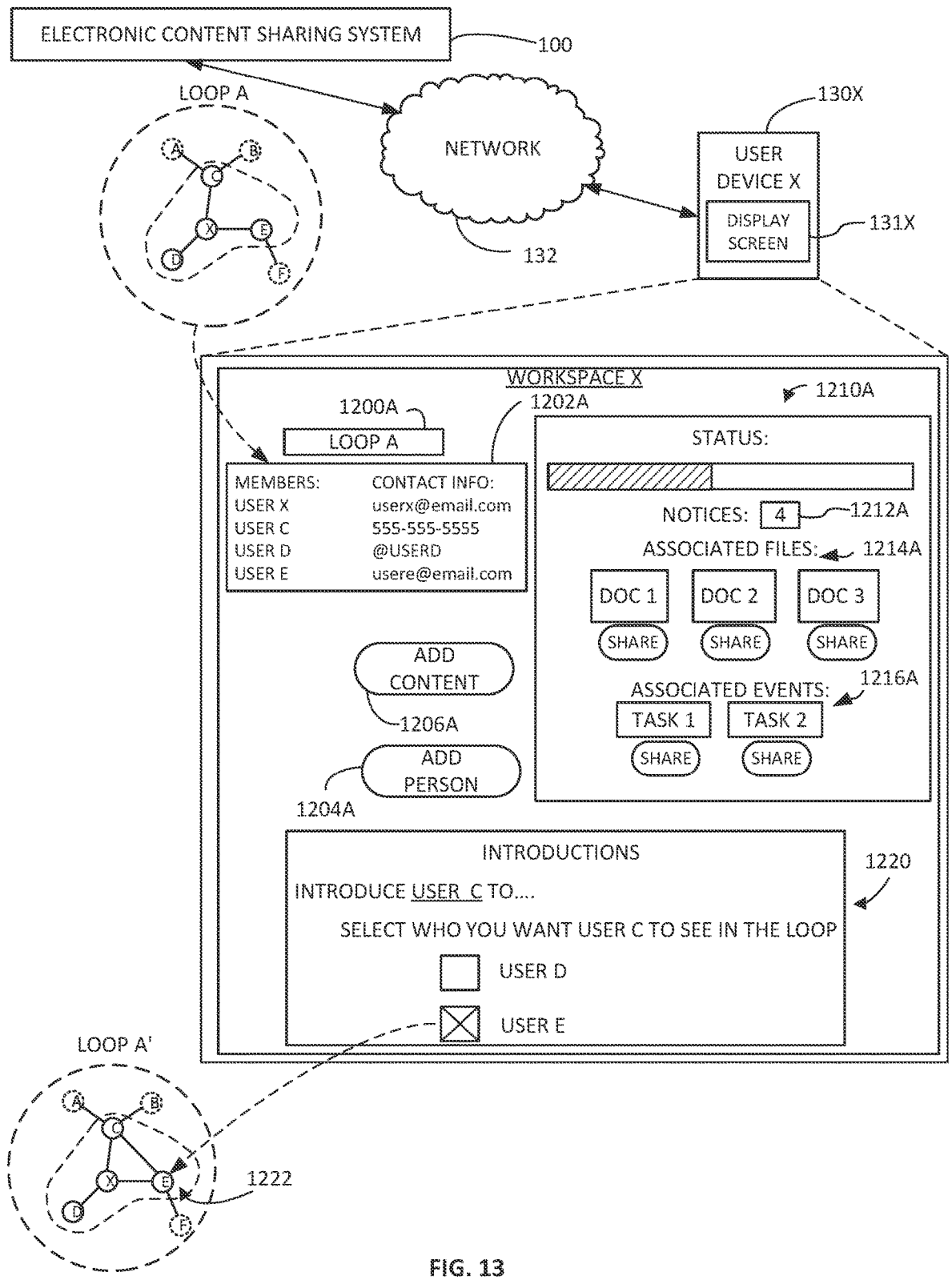
FIG. 13 illustrates an example introduction made between two members of workspace that is facilitated by an electronic content sharing system.

FIG. 13 illustrates an example introduction made between two members of workspace that is facilitated by the electronic content sharing system 100. For the purposes of illustration, loop A and workspace X of FIG. 12 are utilized. As shown by loop A, user X has user C and user E in their network. Using the introductions portion 1220 of the workspace X, user X can selectively determine which user they wish to introduce to user C. In the illustrated embodiment, user X has selected user E. Once the introduction has been made, and in some case accepted by both users, a connection 1222 is made between user C and user E to establish loop A'.

The above descriptions of various components and methods are intended to illustrate specific examples and describe certain ways of making and using the systems disclosed and described here. These descriptions are neither intended to be nor should be taken as an exhaustive list of the possible ways in which these systems and modules can be made and used. A number of modifications, including substitutions of systems and modules between or among examples and variations among combinations can be made. Those modifications and variations should be apparent to those of ordinary skill in this area after having read this document.

We claim:

1. A method, performed by an electronic content sharing system having a memory and a processor, for regulating control and access to electronic content to handle complexity of interactions in an electronic transaction, the method comprising:
receiving electronic content that a set of recipients are each to perform an electronic action in relation thereto;
for the electronic content, assigning a document access level, that establishes permissions, for each of the one or more recipients,
wherein the permissions established via each assigned document access level are not based on a role of a particular recipient in a transaction associated with the electronic content;
communicating, based on the assigned document access levels, the electronic content to the a set of recipients; and
when the electronic action is performed against the electronic content by at least one of the set of recipients:
updating the electronic content based on the performed electronic action; and
communicating the updated electronic content to the at least one recipient and/or another recipient.

2. The method of claim 1, wherein assigning the document access level is based on a type of the transaction.

3. The method of claim 1, wherein an indication of the updated electronic content is automatically communicated to an originator associated with the electronic content in response to performance of the electronic action.

4. The method of claim 1, further comprising:
communicating the electronic content to a second recipient identified by a first recipient.

5. The method of claim 4, wherein the first recipient is one of the set of recipients.

6. The method of claim 5, wherein the electronic content communicated to the second recipient comprises a request by the first recipient for the second recipient to perform a second electronic action.

7. The method of claim 6, further comprising:
when the second electronic action is performed by the second recipient, communicating an indication of the performed second electronic action to the first recipient.

8. The method of claim 1, wherein the electronic action comprises a request to:
execute an electronic signature by a first recipient among the set of recipients,
wherein upon execution of the electronic action by the first recipient in relation to the electronic content, the electronic signature uniquely identifies the first recipient from other recipients among the one or more recipients.

9. The method of claim 1, wherein the electronic action comprises a request to: agree to terms and conditions, supply information, or a combination thereof.

10. The method of claim 1 further comprising:
displaying the electronic content to the set of recipients; and
receiving an indication of performing the electronic action against the displayed electronic content from the at least one recipient.

11. The method of claim 1 further comprising:
when the electronic action is performed, displaying the updated electronic content to the at least one recipient and/or another recipient.

12. At least one non-transitory, computer-readable medium carrying instructions, which when executed by at least one data processor, performs operations for regulating control and access to electronic content to handle complexity of interactions in an electronic transaction, the operations comprising:
receiving electronic content that a set of recipients are each to individually perform an electronic action in relation thereto;
for the electronic content, assigning a document access level, that establishes permissions, for each of the set of recipients,
wherein the permissions established via each assigned document access level are not based on a role of a particular recipient in a transaction associated with the electronic content;
communicating, based on the assigned document access levels, the electronic content to the set of recipients; and
when the electronic action is performed against the electronic content by at least one of the set of recipients:
updating the electronic content based on the performed electronic action; and
communicating the updated electronic content to the at least one recipient and/or another recipient.

13. The computer-readable medium of claim 12, wherein the operations further comprise: communicating an indication of the updated electronic content to an originator associated with the electronic content.

14. The computer-readable medium of claim 12, wherein the electronic action comprises a request to:
execute an electronic signature by a first recipient among the set of recipients,
wherein upon execution of the electronic action by the first recipient in relation to the electronic content, the electronic signature uniquely identifies the first recipient from other recipients among the set of recipients.

15. A method for regulating control and access to electronic documents to handle complexity of interactions in an electronic transaction, performed by a computing system having at least one memory and at least one processor, the method comprising:
hosting an electronic workspace, wherein the electronic workspace identifies:
one or more electronic documents selectably sharable with one or more workspace members;
for at least one electronic document in the electronic workspace:
assigning a document access level, that establishes permissions, for each of the one or more workspace members,
wherein the permissions established via each assigned document access level are not based on a role of a particular workspace member in a transaction associated with the electronic document; and controlling access to an electronic document identified in the electronic workspace by a workspace member based on the assigned document access level of the workspace member for the electronic document.

16. The method of claim 15, wherein the permissions established by a first document access level are different from the permissions established for the workspace member by a second document access level.

17. The method of claim 15, wherein the document access level comprises at least one of: access to view a document and access to edit the document.

18. The method of claim 15, further comprising:
facilitating a virtual introduction between two members in the electronic workspace, wherein each of the two members is associated with a respective workspace.

19. The method of claim 15, wherein hosting the electronic workspace comprises:
hosting one or more share-centric loops,
wherein each share-centric loop of the one or more share-centric loops is:
(1) accessible by each of one or more users ; and
(2) comprises one or more electronic documents accessible by each of the one or more users.

20. The method of claim 19, wherein accessibility to each share-centric loop is granted based on a sharing of the one or more electronic documents.

\* \* \* \* \*